(12) United States Patent
Birdwell

(10) Patent No.: US 7,009,581 B2
(45) Date of Patent: Mar. 7, 2006

(54) DYNAMIC DIFFRACTIVE OPTICAL TRANSFORM

(76) Inventor: William A. Birdwell, 5948 SW. Riveridge La., Portland, OR (US) 97201

( * ) Notice: Subject to any disclaimer, the term of this patent is extended or adjusted under 35 U.S.C. 154(b) by 0 days.

(21) Appl. No.: 10/915,891

(22) Filed: Aug. 9, 2004

(65) Prior Publication Data

US 2005/0017925 A1    Jan. 27, 2005

Related U.S. Application Data

(60) Continuation of application No. 10/209,051, filed on Jul. 30, 2002, now Pat. No. 6,774,871, which is a continuation of application No. 09/260,195, filed on Mar. 1, 1999, now Pat. No. 6,437,762, which is a division of application No. 08/371,278, filed on Jan. 11, 1995, now Pat. No. 5,877,876.

(51) Int. Cl.
G09G 3/16    (2006.01)
G09G 3/34    (2006.01)

(52) U.S. Cl. ............................................ 345/48; 345/84

(58) Field of Classification Search .............. 345/7–10, 345/32, 38, 48–55, 81–87, 39, 59; 349/201; 359/237, 36–39, 95; 385/15–18
See application file for complete search history.

(56) References Cited

U.S. PATENT DOCUMENTS

| 3,040,625 A | 6/1962 | Zito, Jr. .......................... 88/61 |
| 3,312,519 A | 4/1967 | Max ............................ 350/161 |
| 3,402,001 A | 9/1968 | Fleisher |
| 3,424,513 A | 1/1969 | Lotspeich .................... 350/180 |
| 3,499,702 A | 3/1970 | Goldmacher et al. ....... 350/150 |
| 3,588,225 A | 6/1971 | Nicastro |
| 3,653,742 A | 4/1972 | Buchan |
| 3,700,306 A | 10/1972 | Cartmell et al. ............. 350/150 |
| 3,751,137 A | 8/1973 | Fitzgibbons et al. ......... 350/160 |
| 3,807,831 A | 4/1974 | Soref .......................... 350/150 |
| 3,836,712 A | 9/1974 | Kornreich et al. ........... 178/7.1 |
| 3,981,559 A | 9/1976 | Channin ..................... 350/160 |
| 4,037,929 A | 7/1977 | Bricot et al. ................. 350/160 |

(Continued)

FOREIGN PATENT DOCUMENTS

FR    2 254 057    11/1973

(Continued)

OTHER PUBLICATIONS

Jeffrey A. Davis, "Programmable diffractive optical elements using spatial light moduclators," Invited Paper, SPIE vol. 1911, pp. 214-225.

(Continued)

Primary Examiner—Vijay Shankar
(74) Attorney, Agent, or Firm—Birdwell & Janke, LLP

(57) ABSTRACT

A dynamic diffractive optical transform. An electric field pattern is created across a body of material, the material being characterized in that it has an optical transmission property which varies in response to of an electric potential applied across a portion thereof. The electric field pattern is created such that the resulting profile of the transmission property is an arbitrary shape which produces a desired diffraction pattern that may not be physically realizable in conventional refractive optics or is a Fresnel lens-like construct derived from a refractive optical element. This is done by selectively applying electric potentials to transparent electrode pairs having liquid crystal material therebetween and preferably relatively small proportions in relation to the relevant wavelength of light, so as to create variations in phase delay that are aperiodic, have other than fifty percent spatial duty factor or have multiple levels of phase delay. The transform is embodied in an optical scanner, an adaptive lens, and an optical switch.

20 Claims, 14 Drawing Sheets

U.S. PATENT DOCUMENTS

| | | | |
|---|---|---|---|
| 4,040,091 A | 8/1977 | Kornreich et al. | 358/213 |
| 4,040,112 A | 8/1977 | Kornreich et al. | 358/213 |
| 4,054,362 A | 10/1977 | Baues | 350/96 |
| 4,063,281 A | 12/1977 | Kornreich et al. | 358/105 |
| 4,093,357 A | 6/1978 | Jacobson et al. | |
| 4,099,207 A | 7/1978 | Kornreich et al. | 358/213 |
| 4,124,273 A | 11/1978 | Huignard et al. | 350/150 |
| 4,190,330 A | 2/1980 | Berreman | 350/331 |
| 4,222,641 A | 9/1980 | Stolov | 353/84 |
| 4,227,201 A | 10/1980 | Grinberg et al. | |
| 4,251,141 A | 2/1981 | Stemme et al. | 354/23 |
| 4,278,327 A | 7/1981 | McMahon et al. | 350/347 |
| 4,290,083 A | 9/1981 | Collender | |
| 4,295,159 A | 10/1981 | Carollo et al. | 358/22 |
| 4,319,239 A | 3/1982 | Stephens | |
| 4,323,920 A | 4/1982 | Collender | |
| 4,346,378 A | 8/1982 | Shanks | |
| 4,367,916 A | 1/1983 | Mottier et al. | |
| 4,385,805 A | 5/1983 | Channin | 350/334 |
| 4,461,543 A | 7/1984 | McMahon | |
| 4,466,708 A | 8/1984 | Betensky | 350/427 |
| 4,516,032 A | 5/1985 | Barr | |
| 4,548,476 A | 10/1985 | Kaneko | |
| 4,566,766 A | 1/1986 | Gur | |
| 4,572,616 A | 2/1986 | Kowel et al. | 350/335 |
| 4,601,545 A | 7/1986 | Kern | |
| 4,606,612 A | 8/1986 | Iizuka | |
| 4,639,091 A | 1/1987 | Huignard et al. | |
| 4,652,087 A | 3/1987 | Bos et al. | 350/332 |
| 4,717,244 A | 1/1988 | Hilsum et al. | |
| 4,806,774 A | 2/1989 | Lin et al. | |
| 4,807,976 A | 2/1989 | Little et al. | |
| 4,832,447 A | 5/1989 | Javidi | |
| 4,832,462 A | 5/1989 | Clark et al. | |
| 4,834,505 A | 5/1989 | Migliorato et al. | |
| 4,838,652 A | 6/1989 | Inaba et al. | |
| 4,848,890 A | 7/1989 | Horn | |
| 4,862,115 A | 8/1989 | Lee et al. | |
| 4,909,626 A | 3/1990 | Purvis et al. | |
| 4,934,782 A | 6/1990 | Soffer et al. | |
| 4,948,229 A | 8/1990 | Soref | |
| 4,949,174 A | 8/1990 | Wiltshire | |
| 4,969,043 A | 11/1990 | Pothier | |
| 4,985,816 A | 1/1991 | Seko et al. | |
| 5,001,557 A | 3/1991 | Begle | |
| 5,005,952 A | 4/1991 | Clark et al. | |
| 5,007,715 A | 4/1991 | Verhulst | |
| 5,013,479 A | 5/1991 | Minai et al. | 252/299.65 |
| 5,023,725 A | 6/1991 | McCutchen | |
| 5,061,042 A | 10/1991 | Nakamura et al. | 359/63 |
| 5,122,888 A | 6/1992 | Iizuka et al. | |
| 5,126,869 A | 6/1992 | Lipchak et al. | |
| 5,150,241 A | 9/1992 | Jeffre et al. | |
| 5,151,814 A | 9/1992 | Grinberg et al. | |
| 5,182,665 A | 1/1993 | O'Calloghan et al. | |
| 5,430,561 A | 7/1995 | Keto | |
| 5,877,876 A * | 3/1999 | Birdwell | 349/39 |
| 6,437,762 B1 * | 8/2002 | Birdwell | 345/48 |
| 6,774,871 B1 * | 8/2004 | Birdwell | 345/48 |

FOREIGN PATENT DOCUMENTS

| | | | |
|---|---|---|---|
| FR | 2 254 057 | 7/1975 | |
| FR | 2 325 954 | 4/1977 | |
| FR | 0 121 449 | 10/1984 | |
| FR | 1 121 449 | 10/1984 | |
| GB | 1 026 318 | 4/1966 | |
| GB | 1061257 | 3/1967 | |
| GB | 1193228 | 5/1970 | |
| JP | 56-46-210 | 4/1981 | 359/40 |
| JP | 56-46210 | 4/1981 | 359/40 |
| JP | 56-150-725 | 11/1981 | 359/40 |
| JP | 56-150725 | 11/1981 | 359/40 |
| WO | WO 85/0546 | 12/1985 | |

OTHER PUBLICATIONS

Jeffrey A. Davis and Don M. Cottrell, "Binary optical elements using spatial light modulators," Invited Paper, SPIE vol. 2152, pp. 226-236.

T. Bui Dinh and T.S. Choi, "Instantaneous bubble velocity measurements using digital image analysis," Opt. Eng. 40(2) Feb. 2001, pp. 325-329.

Jeffrey A. Davis, "Programmable axial apodizing and hyper-resolving amplitude filters with a liquid-crystal spatial light modulator," Optics Letters, vol. 24, No. 9, May 1, 1999, pp. 628-630.

Hua-Kuang Liu, "Optical-data-processing properties of a liquid-crystal television spatial light modulator," Optics Letters, vol. 10, No. 12, Dec. 1985, pp. 635-637.

Andres Marquez et al, "Amplltude apodizers encoded onto Fresnel lenses implemented on a phase-only spatial light modulator," Applied Optics, vol. 40, No. 14, May 10, 2001, pp. 2316-2322.

Jeffrey A. Davis et al, "Nondiffracting interference patterns generated with programmable spatial light modulators," Applied Optics, vol. 35, No. 4, Feb. 1, 1996, pp. 599-602.

Jeffrey A. Davis, Jarod Guertin and Don M. Cottrell, "Diffraction-free beams gathered with programmable spatial light modulators," Applied Optics, vol. 32, No. 31, Nov. 1, 1993, pp. 6368-6370.

Don M. Cottrell et al, "Multiple imaging phase-encoded elements written as programmable spatial light modulators," Applied Optics, vol. 29, No. 17, Jun. 10, 1990, pp. 2505-2509.

Jeffrey A. Davis et al, "Suppression of selected diffration orders with programmable masks written on spatial light modulators," Applied Optics, vol. 27, No. 14, Jul. 15, 1988, pp. 2949-2953.

Jeffrey A. Davis, et al, "High efficiency optical reconstruction of binary phase-only filters using the Hughes liquid crystal light waave," Applied Optics, vol. 26, No. 5, Mar. 1, 1997, pp. 929-933.

Jeffrey A. Davis et al, "Enclding amplitude information onto phase-only filters," Applied Optics, vol. 38, No. 23, Aug. 10, 1999, pp. 5004-5013.

Jeffrey A. Davis et al, "Encoding amplitude and phase informationo nto a binary phase-only spatial light modulator," Applied Optics, vol. 42, No. 11, Apr. 10 2003, pp. 2003-2008.

Alan Purvis, Geoffrey Williams & Norman J. Powell, "Liquid crystal phase modulators for active micro-optic devices," SPIE vol. 1455, Liquid Crystal Devices and Materials (1991), pps. 145-149.

Hirsch et al., "Scanning Monochromator" IBM Tech. Disc. Bulletin, vol. 12, No. 11, Apr. 1970, pp. 1806.

IEE Transactions of Electron Devices, col. Ed-26, No. 11 Nov. 1979, pp. 1734-1737, Hori et al., "Field-Controllable Liquid Crystal Phase Granting".

Printout of research proposal summary from DIALOG Information Services obtained Aug. 18, 1992. The applicant has been told by NITS that the prosposal summary was made available on DIALOG Sep. 28, 1991.

Focusing by Electrical Modulation of Refraction in a Liquid Crystal Cell; S. Kowel et al.; Applied Optics/vol. 23, No. 2, Jan. 15, 1984; pp. 278-289.

Diffractive Optical Elements for Use in Infrared Systems; G. Swanson et al.; *Optical Engineering,* Jun. 1989, vol. 28, No. 5; pp. 605-608.

The Phase Fresnel Lens; K. Miyamoto; *The Journal of the Optical Society of America;* vol. 51, No. 1; pp. 17-20.

Some Effects of Fourier-domain Phase Quantization; J. Goodman et al.; *IBM J. Res. Develop.;* Sep. 1970; pp. 478-484.

The Kinoform: A New Wavefront Reconstruction Device; L. Lesem et al.; *IBM J. Res. Develop.;* Mar. 1969; pp. 150-155.

Proceedings of SPEI—The International Society for Optical Engineering v. 1455. "Liquid-crystal phase modulators for active micro-optic devices," 1991.

Journal de Physic (Paris) v. 51 n. 4 "Physical properties and alignment of polymer-monomer ferroelectric liquid crystal mixture," 1990.

Journal of the American Chenical Society v. 110 n. 26. "Design and synthesis of new ferroelectric liquid crystals," Dec. 21, 1988.

CLEO 88 Conference on Lasers and Electro-Optics. Technical Digest Series, vol. 7. "Electrooptic shutter/chopper using ferroelectric liquid crystals," 1988.

Proceedings of SPEI—The International Society for Optical Engineering v. 1455. "Total internal reflection studies of a ferroelectric liquid crystal/anisotropic sold interface," 1991.

* cited by examiner

Fig. 2A
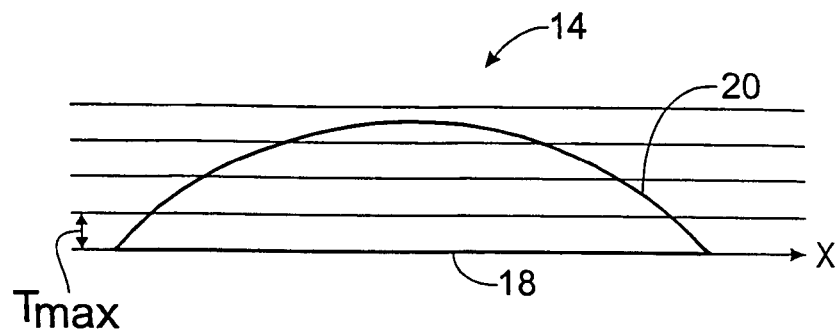
Fig. 2B
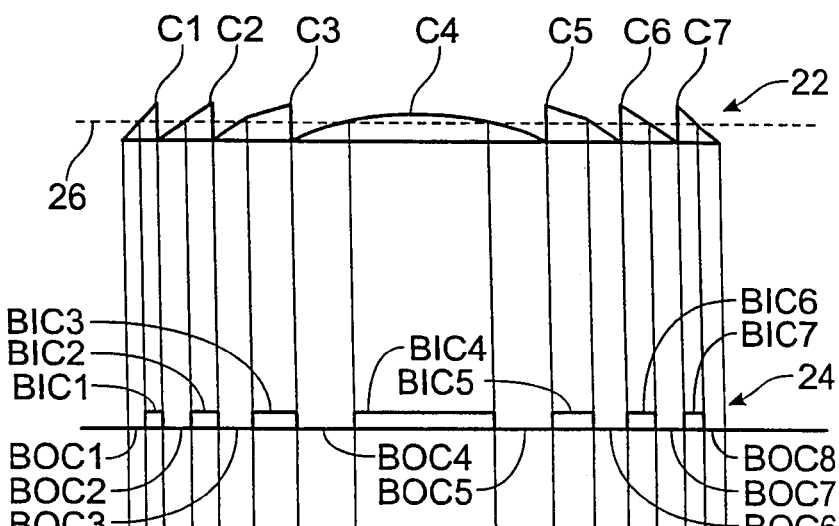
Fig. 2C
Fig. 2D
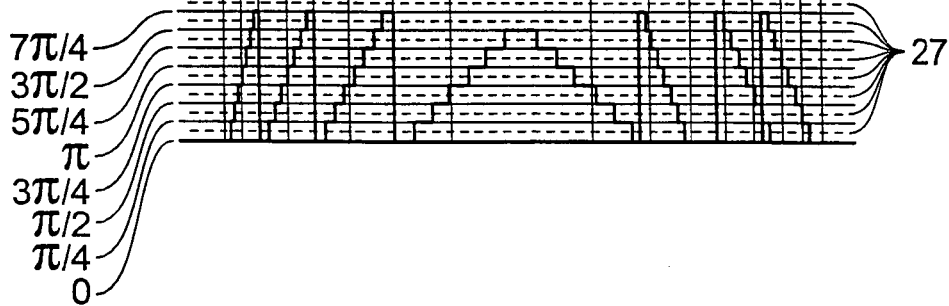

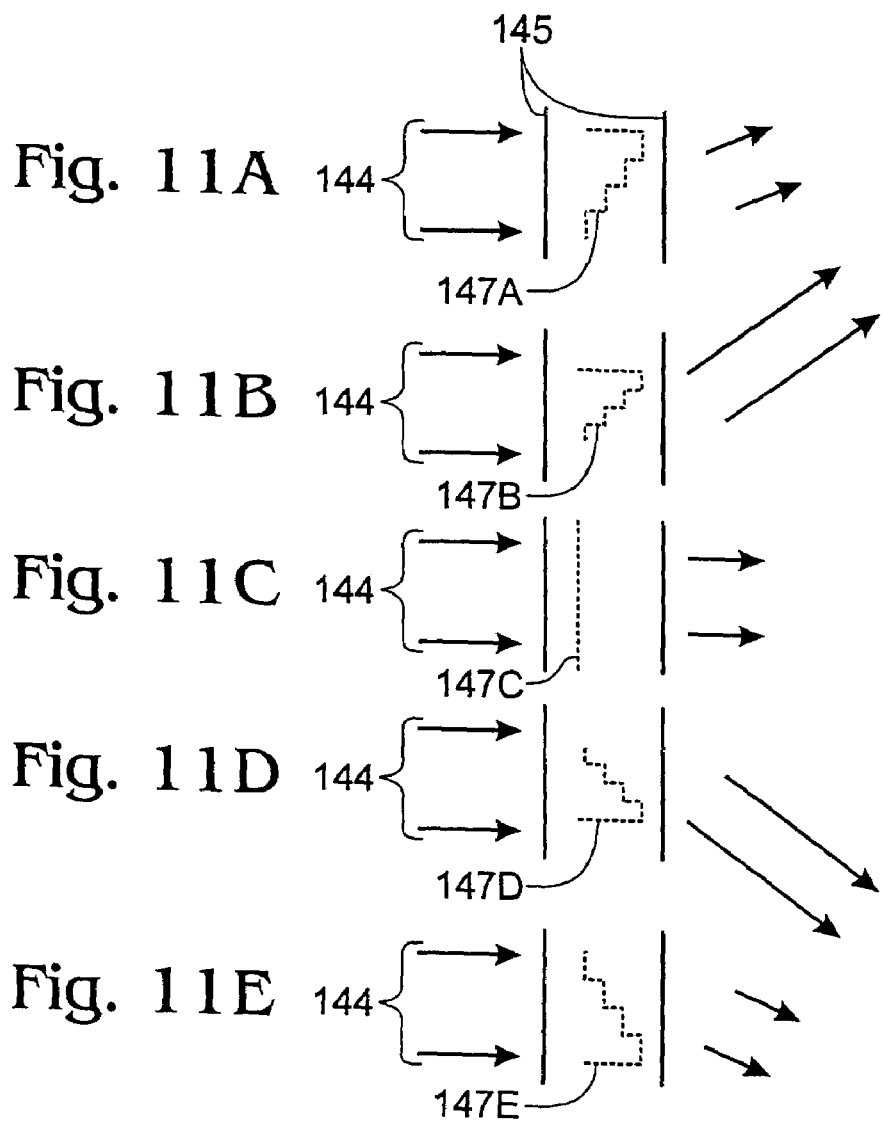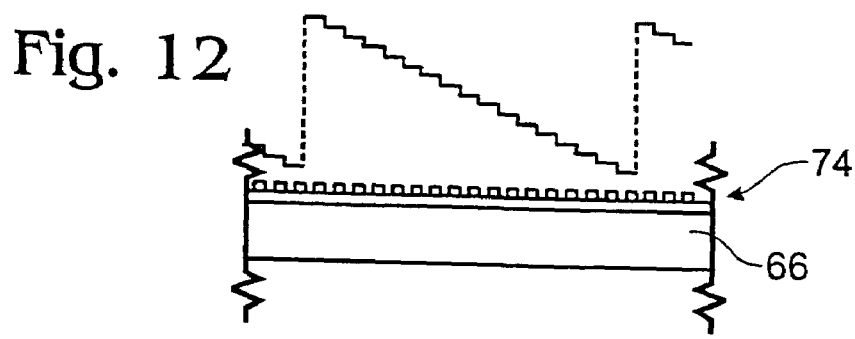

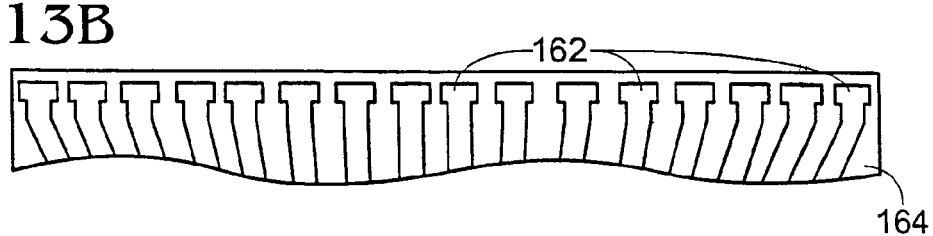
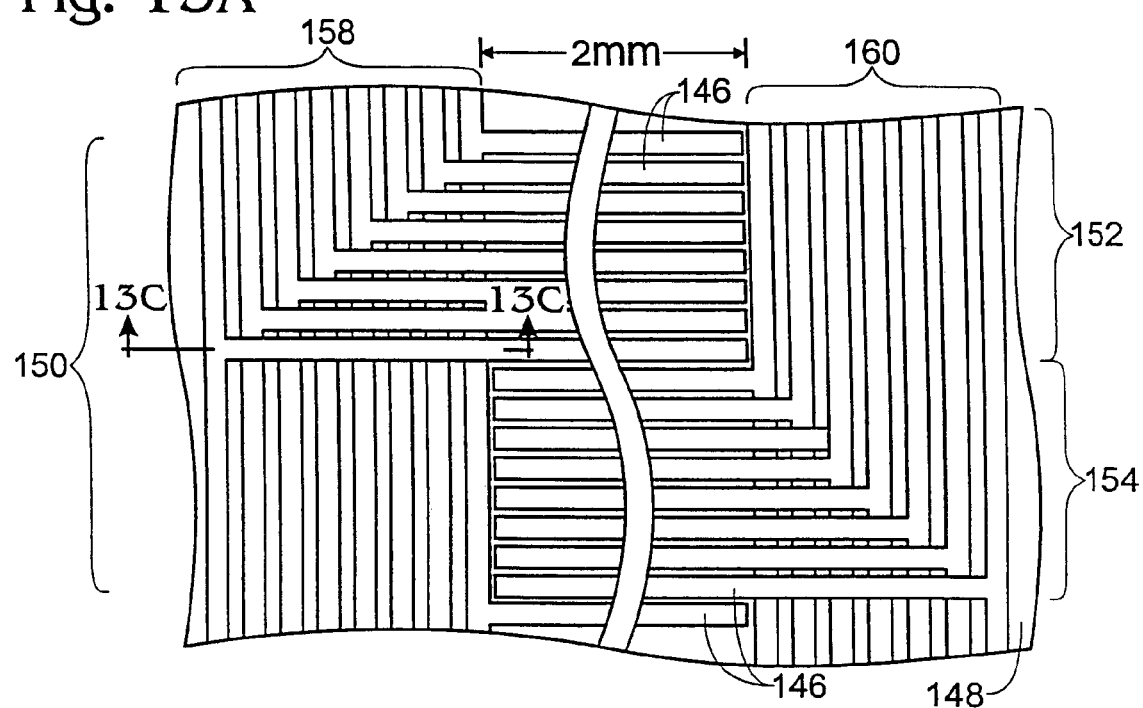
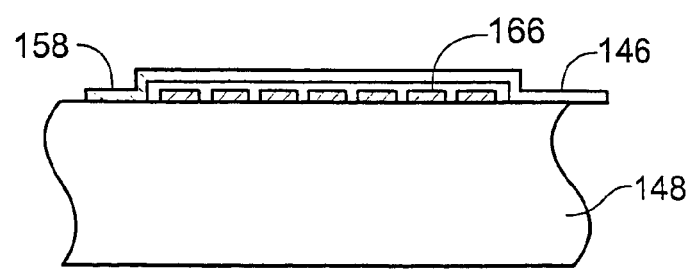

DYNAMIC DIFFRACTIVE OPTICAL TRANSFORM

Continuation of prior application Ser. No.: 10/209,051, now U.S. Pat. No. 6,774,871 which is a continuation of prior application Ser. No.: 09/260,195, now U.S. Pat. No. 6,437,762 which is a divisional of prior application Ser. No.: 08/371,278, now U.S. Pat. No. 5,877,876.

BACKGROUND OF THE INVENTION

This invention relates to devices and methods for transforming an optical wavefront in accordance with a predetermined transfer function, and particularly to a device and method for selectively transforming an optical wavefront using principles of diffractive optics.

Optical transform devices of various types are commonly employed in optical systems. They work by modifying the wavefront of incoming light in a predetermined way to produce a new wavefront. In mathematical terms, this may usually be thought of as a mapping of one space by which the incoming wavefront is described to another space by which the new wavefront is described. One common optical transform device is a lens with two convex spherical surfaces. Such a lens can be used to focus an incoming wavefront to a point. Mathematically, it performs a Fourier transform on the incoming wavefront. Two other common optical transform devices are mirrors, which can be used to deflect or focus a wavefront, and prisms, which can also be used to deflect wavefronts. Spherical-surface lenses, mirrors and prisms all work according to principles of refraction, and mirrors work according to the principles of reflection. However, there are also optical transform devices that work on principles of diffraction, such as diffraction gratings, which deflect a wavefront, and zone plates, which focus a wavefront.

It is often desirable to employ variable transform devices in practical applications. For example, mechanically-adjustable, multi-element lens systems are commonly used in cameras to provide variable focal length and magnification. One such system is shown in Betensky U.S. Pat. No. 4,466,708 entitled ZOOM LENS. As another example, rotating or oscillating mirrors are commonly used in optical scanners to deflect a beam of light to a selected position. However, such devices have numerous drawbacks. They either must be manually adjusted or driven by a relatively bulky, often heavy and power-consuming motor. They often require expensive precision machining and are subject to mechanical misalignment and wear. Also, practical manufacturing techniques require making compromises in the surfaces of the devices that produce undesirable aberrations in the wavefront. Consequently, numerous efforts have been made to develop electrically-controllable variable optical transforms that do not require a motor.

One such device is a variable focal length refraction lens disclosed by Lotspeich, U.S. Pat. No. 3,424,513 entitled ELECTRO-OPTIC VARIABLE FOCAL LENGTH LENS. It employs a liquid Kerr effect medium which is bulky, difficult to control and requires very high voltage, on the order of 20,000 volts. It also performs a limited type of transform, namely a bi-convex spherical lens transform. Consequently, it is impractical for the majority of optical transform applications.

Max U.S. Pat. No. 3,312,519, entitled WIDE RANGE HIGH SPEED ADJUSTABLE FOCUSING OF HIGH FREQUENCY ELECTROMAGNETIC RADIATION, discloses a type of adjustable zone plate which employs a diffraction pattern of concentric circles produced by an acoustical standing wave which propagates across a parabolic plexiglass surface. It is dependent on and subject to the limitations of an intermediate, electro-acoustic transducer and performs only a limited type of transform, namely a zone plate transform. Consequently, it has relatively limited application.

Another electrically-controllable, variable optical transform is disclosed by Zito U.S. Pat. No. 3,040,635 entitled BEAM SCANNING APPARATUS. In this case, a voltage is applied to prism-shaped cells containing either a variable dielectric material or a Kerr effect material to vary the index of refraction of the cell material and thereby cause the light travelling through the cell to be deflected a selected amount. Like the device disclosed in Lotspeich U.S. Pat. No. 3,424,513, this has the disadvantages of employing a liquid medium that is hard to control, bulky, requires relatively high voltage to operate and performs a limited transform function.

Huiginard et al. U.S. Pat. No. 4,124,273, entitled VARIABLE VERGENCY FOCUSSING APPARATUS, discloses an electrically variable focal length lens system that employs solid Kerr effect cell as a lens. However, as is characteristic of Kerr effect devices, it requires high voltage, on the order of 4,000 volts, to operate and, even then, can only vary the focal point by about 80 micrometers. Also, the index of refraction profile of each lens is dependent on the distribution of electric field between two parallel, relatively thin electrodes, which only approximates a spherical surface. Thence, this device also has limited application.

Several electrically-adjustable optical transform devices using liquid crystals have previously been devised. Liquid crystal material is electro-optically anisotropic such that its index of refraction along one axis can be varied with respect to another, orthoganal axis by the application of an electric potential across the material. It has the advantage that significant changes in the index of refraction along one axis can be effected by a relatively low voltage. For example, a change in index of refraction $\Delta n$ of about 0.2 can be effected by the application of just a few volts of electric potential across the material.

Bricot et al. U.S. Pat. No. 4,037,929, entitled OPTICAL PROJECTION DEVICE AND AN OPTICAL READER INCORPORATING THIS DEVICE, discloses a hollow convex lens containing nematic liquid crystal material and having transparent electrodes disposed on the opposite interior surfaces of the lens. By applying a selected voltage across the two electrodes, the index of refraction of the liquid crystal, and therefore the index of refraction of the lens, for light of a given polarization may be varied. The focal length of the Bricot et al device can be varied about 15 micrometers, but it requires the construction of a hollow, plano-convex lens and has limited application as an optical transform. A similar device is disclosed in Berreman U.S. Pat. No. 4,190,330 entitled VARIABLE FOCUS LIQUID CRYSTAL LENS SYSTEM, the main difference being that Berreman discloses the use of two back-to-back plano-convex hollow lenses for achieving polarization insensitivity. Kowel et al. U.S. Pat. No. 4,572,616, entitled ADAPTIVE LIQUID CRYSTAL LENS, also discloses a hollow cell having parallel faces and filled with liquid crystal material between transparent electrodes for varying the index of refraction of the liquid crystal material. In this case, at least one side of the cell employs an array of electrodes. The voltages applied to the electrodes are controlled so that the index of refraction across the cell varies smoothly in accordance with the desired profile. One problem with each of these liquid crystal lens devices is that they are based on optical refraction principles. This means that in order to accomplish a substantial variation in focal length the cell must be relatively thick. Thick cells without aberrations due to variations in the surface contour of the cell wall are difficult to construct, and the response time of a liquid crystal cell increases with the thickness of the material.

Liquid crystal material has also been used in a diffractive optical transform device, namely an adjustable diffraction grating, as disclosed in d' Auria et al. French Pat. No. 73 42147. However, the device disclosed in that patent is limited in that it produces multiple diffraction orders, thereby rendering it relatively inefficient as a light beam steering device applicable only to those situations where multiple diffraction orders can be tolerated.

There are a number of applications for which an effective, versatile, electrically-controllable optical transform device could be used. In addition to an adaptive lens and a scanner, as discussed above, mapping one space to another can be employed to switch one set of optical input signals to a selected set of outputs. While liquid crystal material has been employed for this purpose, as disclosed in McMahon et al. U.S. Pat. No. 4,278,327 entitled LIQUID CRYSTAL MATRICES, many configurations used for this purpose experience increased power loss with each additional port and are difficult to construct so as to be polarization insensitive.

Therefore, it would be desirable to have an optical transform device that does not have the problems or limitations of known electrically-controllable optical lens, scanner and switch devices.

SUMMARY OF THE INVENTION

The present invention overcomes the limitations of previous optical transform and switching devices and methods by providing a dynamic optical transform device and method which operate on principles of diffractive optics. An electric field pattern is created across a body of material, preferably in the shape of a right rectangular prism having first and second opposing faces, the material being characterized in that it has an optical transmission property which varies in response to an electric potential applied across a portion of the material. In general, the electric field pattern is created such that an arbitrary diffraction pattern may be produced. In particular, an electric field pattern may be created such that the profile of the transmission property is the same shape as a Fresnel lens-like construct derived from a refractive optical element, or is a predetermined, multiple-valued property which produces a desired diffraction pattern that is not, at least as a practical matter, physically realizable in conventional refractive optics. A light wavefront is then passed through the body of material and the electrically created transmission property profile transforms the wavefront in a predetermined manner.

Preferably, the transform comprises one or more cells comprising the body of material and having transparent electrodes arranged in a predetermined pattern on opposing interior faces of each cell and selectively driven by a circuit which thereby produces the desired electric field pattern. The electrodes may be driven so as to produce an arbitrary transmission property pattern, or a transmission property pattern which approximates the shape of a Fresnel lens-like construct or is quantized to produce a multiple-level representation of the construct. Preferably, the electrodes effectively partition the body of material into divisions whose proportions relative to the wavelength of light result in significant diffraction. Also, preferably, the body of material comprises liquidcrystal material. Further, a multiple-level phase delay embodiment preferably employs at least sixteen phase delay levels so as to produce high diffraction efficiency.

One specific embodiment of the transform is employed as a scanner, the construct being derived from a right triangular prism. A second specific embodiment of the transform is a variable focal length lens, the construct being derived from a plano-convex lens.

Another specific embodiment of the transform is employed as an optical switch. For a 1×N port switch, one port employs the scanner embodiment of the transform so as to couple a light beam between that port and any of N other ports. For an N×M switch, each port preferably has a scanner embodiment of the transform. In addition to scanning, the transform may be caused to focus the beam to counteract diffraction so as to increase coupling and to compensate for aberrations in optical elements.

A pair of orthogonally-oriented scanner embodiments of the transform are used in series to produce a two-dimensional transform. A half wave plate may be placed between a pair of transforms to render the resulting transform polarization insensitive.

Accordingly, it is a principal object of the present invention to provide a new and improved optical transform device and method.

It is another object of the present invention to provide a dynamic optical transform which employs diffractive optic principles.

It is a further object of the present invention to provide a dynamic optical transform derived from a Fresnel lens-like construct.

It is yet another object of the present invention to provide a dynamic optical transform which can produce an arbitrary diffraction pattern.

It is yet a further object of the present invention to provide a multiple-level or quantized dynamic diffractive optic element.

It is another object of the present invention to provide an optical switch which employs a dynamic diffractive optic element to couple light selectively from one or more ports of a first set to one or more ports of a second set.

The foregoing and other objects, features and advantages of the invention will be more readily understood upon consideration of the following detailed description of the invention, taken in conjunction with the accompanying drawings.

BRIEF DESCRIPTION OF THE DRAWINGS

FIG. 2A is a diagram of the profile along an axis x of the thickness of a plano-convex lens.

FIG. 2B is a diagram of a construct corresponding to the plano-convex lens of FIG. 2A along an axis parallel to axis x thereof.

FIG. 2C is a diagram of a binary optic element corresponding to the plano-convex lens of FIG. 2A along an axis parallel to axis x thereof.

FIG. 2D is a diagram of an eight-level optic element corresponding to the plano-convex lens of FIG. 2A along an axis parallel to axis x thereof.

FIGS. 11A–11E illustrate how a four-level optical element derived from a prism can be used to steer a light beam according to the present invention.

FIG. 12 shows a partial, side view of the liquid crystal cell of FIG. 5A, showing only one transparent substrate and the sixteen-level optic index of refraction profile produced by voltages applied to the electrodes so as to produce a transform derived from a prism according to the present invention.

FIG. 13A shows a cut away and enlarged portion of a liquid crystal cell substrate, one portion showing an electrode configuration for a sixteen element optical element specifically for producing a transform derived from a prism.

FIG. 13B shows a cut away portion of the liquid crystal cell substrate of FIG. 13A enlarged some, but much less than FIG. 13A, showing the electrode input connections of the substrate, according to the present invention.

FIG. 13C shows a cross section of the electrode configuration of FIG. 13A, taken along line 13C—13C thereof.

FIG. 16B shows a liquid crystal dynamic diffractive optical element according to the present invention which produces a two-dimensional transform.

DETAILED DESCRIPTION OF THE INVENTION

Figure 1A:
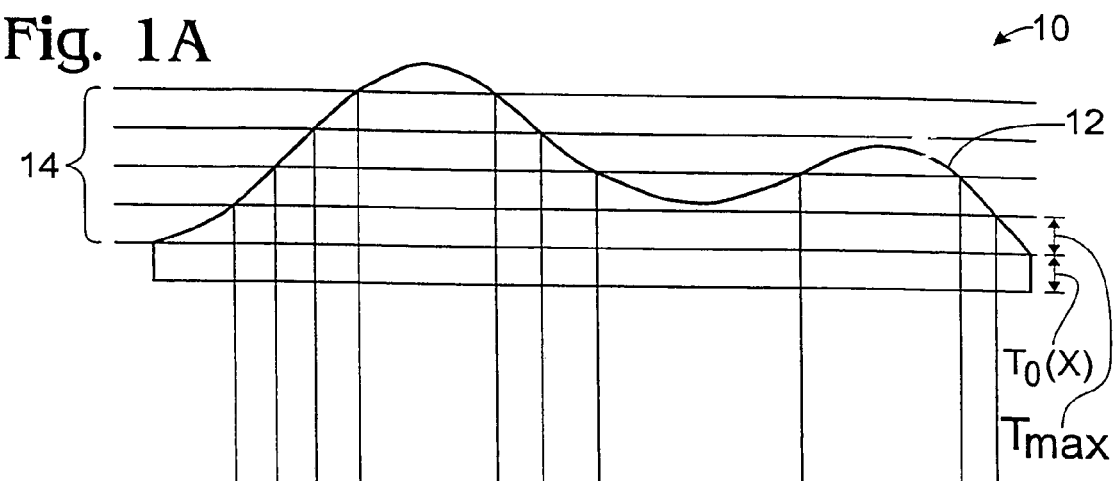
FIG. 1A is a diagram of the profile of the thickness of an arbitrary optical element along an axis x.

Turning first to FIG. 1A, an arbitrary optical transform is represented by a corresponding arbitrary optical element 10 of uniform index of refraction having a profile 12 along an axis x, the profile 12 representing the thickness of the element. Since the thickness of an optical element is typically much greater than the wavelength $\lambda$ of light in the medium of the element, an amount of material under the profile 12 equal in thickness to some positive integer number of wavelengths of light ($2\pi N$ radians, where N is a positive integer) can be removed from the element and the remainder lowered, yet the element will have substantially the same effect on that wavelength of light. That is, an element having a profile according to the following equation would produce the same result:

$$T(x)=T_0(x)+F(x)(\text{mod } T_{max})$$

where

T(x)=the thickness of the element with respect to the x axis, $T_0(x)$=the thickness of the base of the element, F(x)=the shape profile 12 in FIG. 1A with respect to the x axis, and $T_{max}$=a maximum permissible amount, or quantum, of thickness that represents $2\pi N$ radians of phase delay within the medium of the element which may be removed from F(x), where N is a positive integer.

F(x)(mod $T_{max}$) means that F(x) is evaluated modulo $T_{max}$.

T(x) describes what will be referred to herein as a one-dimensional Fresnel lens-like "construct." Throughout this Description reference to a construct is ordinarily to be considered for purposes of explanation reference to a phase-delay construct. However, it is to be understood that the principles of the invention encompass other transmission properties as well.

Figure 1B:
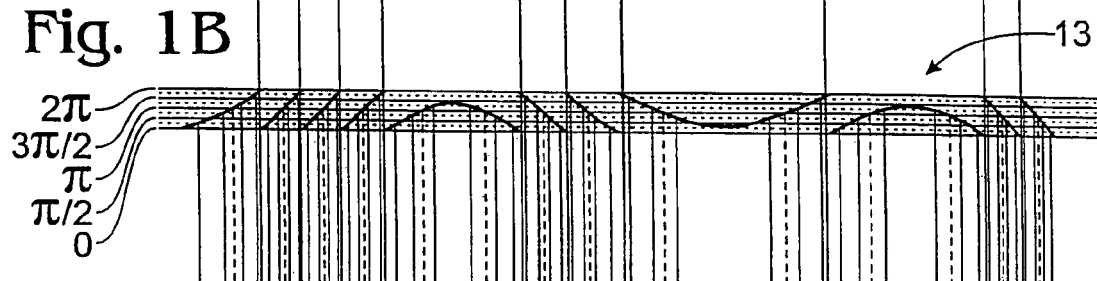
FIG. 1B is a diagram of a Fresnel lens-like construct corresponding to the optical element of FIG. 1A along an axis parallel to an axis x thereof.

The profile 13 of FIG. 1B is constructed by using only that portion above one of lines 14 in FIG. 1A which remains after the maximum number of $T_{max}$ quanta are subtracted and lowering that remainder to the position of the material that was removed, the distance between lines 14 representing $T_{max}$. Thence, it can be seen that the construct of FIG. 1B can be much thinner than a conventional optical element, the actual thickness being limited by fabrication techniques. This property of the construct makes the use of liquid crystal cells to produce diffractive optical elements especially advantageous and enables them to provide a dramatic improvement over prior art liquid crystal optical transform devices, as will be explained hereafter.

Figure 1D:
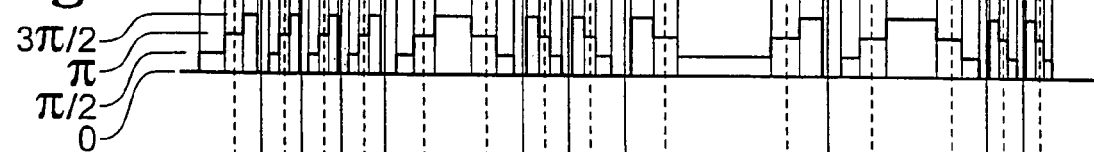
FIG. 1D is a diagram of a four-level optic element corresponding to the optical element of FIG. 1A along an axis parallel to axis x thereof.
Figure 1C:
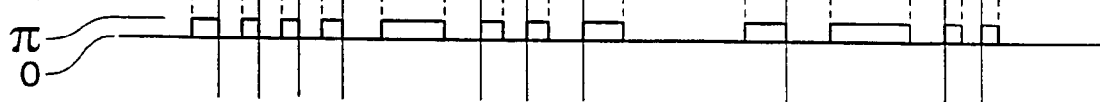
FIG. 1C is a diagram of a binary optic element corresponding to the optical element of FIG. 1A along an axis parallel to axis x thereof.

Turning now to FIG. 1C, a binary, i.e., two-level quantized, optic element may be produced by further quantizing the profile of FIG. 1B into one of two phase-delay levels, that is, 0 and $N\pi$ radians of phase delay, where N is an odd integer. Quantization has been accomplished by selecting threshold values halfway between the quantization level and selecting the upper level if the threshold is exceeded, otherwise selecting the lower level.

However, a binary optic element is only about 40.5% efficient. For purposes of this description "efficiency" means the percentage of optical power from an incoming wavefront that emerges in a preferred order of the diffraction image of the outgoing wavefront. For two-level quantization, significant higher order diffraction images are produced. Greater efficiency can be achieved by quantizing the construct into more levels. Specifically, the following efficiencies can be achieved: 2 levels: 40.5%; 4 levels: 81.0%; 8 levels: 95.0%; and 16 levels: 99.0%. G. Swanson and W. Veldkamp, "Diffractive Optical Elements for Use in Infrared Systems," 28 Opt. Enqr. 605–08 (June 1989). By way of example, FIG. 1D illustrates a four-level quantized optic element; that is, the profile is quantized into four distinct thicknesses, or phase-delay levels representing 0, $\pi/2$, $\pi$ and $3\pi/2$ radians of phase delay. Hereinafter devices quantized into two or more thickness, phase delay, or other transmission property levels are referred to as "multiple-level" diffractive optic devices or elements. Multiple-level diffractive optic elements are ordinarily fabricated by masking and etching processes like those used in the manufacture of integrated electronic circuits.

By way of illustration, two specific diffractive optic elements, corresponding to two common refractive optic elements, are described herein. However, it is to be recognized that the principles of the invention may be applied to many, if not all, two dimensional optical transforms where their effect can be explained by principles of diffraction, including transforms that are not physically realizable by conventional refractive optics. The two elements used for illustration are a plano-convex lens 14, shown in FIG. 2A, and a prism 16, shown in FIG. 3A.

First, the plano-convex lens 15 has one substantially flat surface 18 and a curved surface 20 whose curve corresponds to the surface of a sphere having radius R. Such lenses are commonly used in optical systems. FIG. 2A shows only a two-dimensional version of such a lens.

A two-dimensional construct of the plano-convex lens in FIG. 2A is shown in FIG. 2B. The construct is produced by dividing the lens of FIG. 2A by sections $T_{max}$ of equal thickness, corresponding to a predetermined phase delay within the medium of the construct for a selected wavelength $\lambda_L$ of light. Preferably, that phase delay is an integer multiple of $2\pi$ radians. That portion of the lens which comprises a full integer number of such sections is discarded and the remainder is kept and lowered to the position of the discarded portion. In the example shown in FIG. 2B, the sections are chosen so as to produce seven curved construct components C1–C7. For the selected wavelength $\lambda_L$, the construct 22 has nearly the same optical performance as the plano-convex lens 15 of FIG. 2A, but is thinner in the axial dimension and uses less material.

Turning to FIG. 2C, a binary optic element 24 corresponding to the plano-convex lens 15 is shown. It is derived from the construct 22 by quantizing the thickness of the construct 22 into one of two values, the quantization threshold being shown by line 26 in FIG. 2B. That is, where the thickness of the construct 22 exceeds the quantization threshold 26, a binary optic component of value "1" is formed, and where that thickness does not exceed the quantization level 26, a binary optic element of level "0" is formed. Preferably, the quantization threshold would be halfway between the last quantization level and $2\pi$ radians more of additional phase delay, but other thresholds could be used without departing from the principles of the invention. This results in eight components, B0C1–B0C8, of level "0" and seven components, B1C1–B1C7, of level "1", as shown in FIG. 2C.

The components BC1–BC8 represent the presence of material which produces a phase delay that is an odd integer multiple of n radians relative to the level "0" components therebetween. That is, the quantization level 26 represents an odd integer multiple of $\pi$ radians of phase delay. It can be shown that the multiple-level diffractive optic element may also be a transmissivity diffractive optic element, in which case the level "1" represents an area through which light is not transmitted and the level "0" represents an area through which light is transmitted, or vice-versa. The phase transmission diffractive optic element is often preferable because it produces no inherent loss of optical power.

While a two-level, phase diffraction, multiple-level diffractive optic element 24 can be used to focus an image to a point with the same focal length as the plano-convex lens of FIG. 2A, its optical efficiency is, as discussed above, only 40.5%. That is, only about 40.5% of the incoming light will be focused to that point. Several other focal points will exist corresponding to higher orders of diffraction, and the lens exhibits a high degree of chromatic dispersion. Consequently, it is desirable to use multiple-level diffractive optic elements with more than one non-zero level of quantization, such as the eight-level element 28 shown in FIG. 2D.

The multiple-level diffractive optic of FIG. 2D is derived from the construct of FIG. 2B in the same way as the element 24 of FIG. 2C, except that instead of quantizing the thickness of the construct into one of two levels, it is quantized into one of eight levels, level "0" through level "7", that is, it has six non-zero levels. Each level represents an integer multiple of $2\pi/8$ radians of additional phase delay. It could also represent an integer amount of optical transmissivity attenuation equal to the maximum transmissivity of the element divided by eight, though such a device would produce an inherent loss of optical power. The lines 27 in FIG. 2D represent the quantization thresholds. This eight-level diffractive element is fabricated in the same manner as the two-level element, though for a given size of element, closer fabrication tolerances are required. The advantages of the eight-level phase delay element are that its optical efficiency is about 95.0% and it produces considerably less chromatic dispersion than a two-level element. A sixteen-level element produced in the same manner would be even more advantageous in those respects.

Turning now to FIGS. 3A–3D, prism 16 is a simple right angle, triangular prism having a base surface 30, an altitude surface 32 and a hypotenuse surface 34, each of which are substantially flat. It may be used for a variety of purposes, one of which is to deflect a light beam. For example, in accordance with the refractive optic principle known as Snell's law, a light beam 36 of wavelength $\lambda_p$ striking the base surface 30 perpendicular thereto will be deflected at the hypotenuse surface 34 at an angle e, as shown by light beam 38 in FIG. 3A.

Figures 3A, 3B, 3C, 3D:
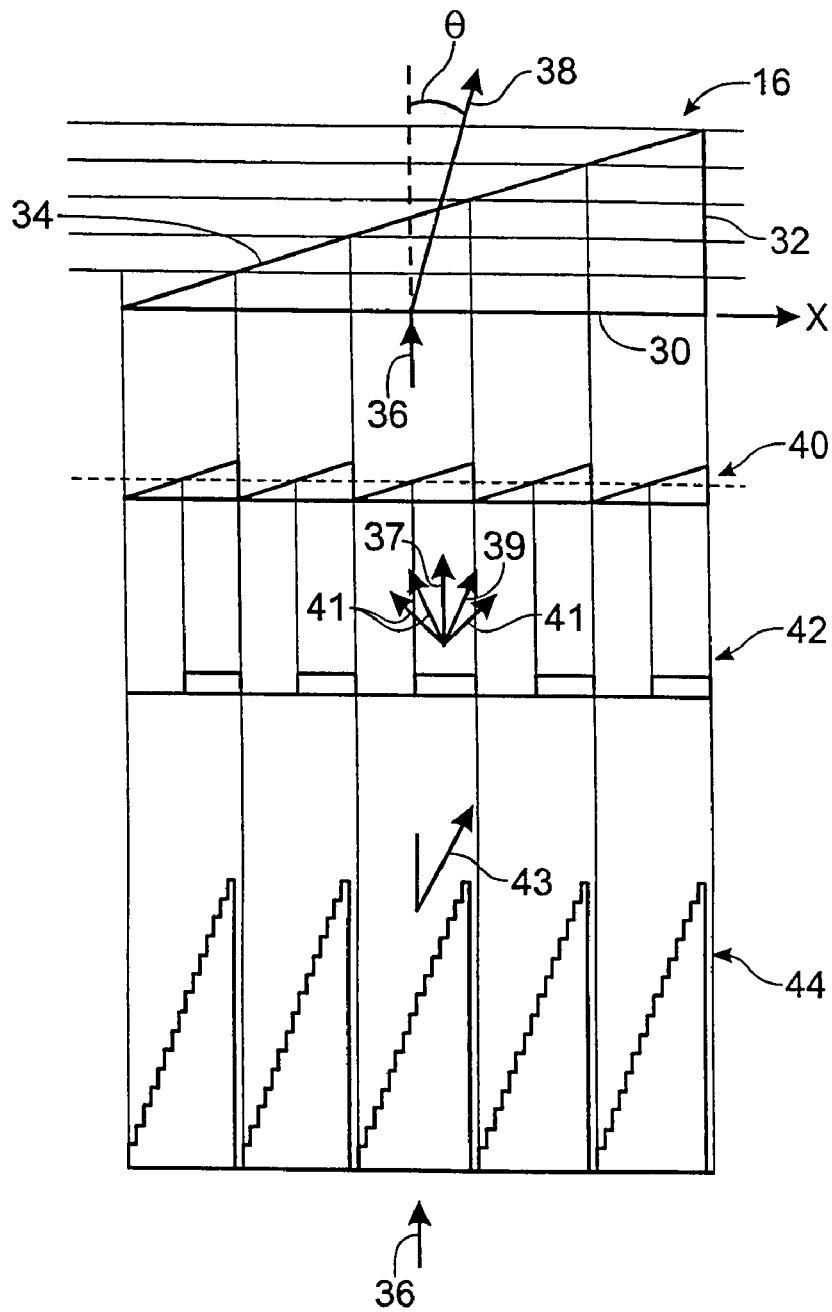
FIG. 3A ia a diagram of the profile along an x axis of the thickness of a prism.
FIG. 3B is a diagram of a construct of the prism of FIG. 3A along an axis parallel to axis x thereof.
FIG. 3C is a diagram of a binary optic element corresponding to the prism of FIG. 3A along an axis parallel to axis x thereof.
FIG. 3D is a diagram of a sixteen-level optic element corresponding to the prism of FIG. 3A along an axis parallel to axis x thereof.

A construct 40 of the prism 16 for wavelength $\lambda_p$ is shown in FIG. 3B. It is derived from the prism 16 in the same manner that the construct 22 of a plano-convex lens is derived from the plano-convex lens 14. Likewise, for wavelength $\lambda_p$ it has nearly the same optical characteristics as the prism 16, and the same thickness and material savings advantages of the construct 22.

A two-level diffractive optic element 42 corresponding to the construct 40 in FIG. 3B is shown in FIG. 3C. It is derived from the construct 40 in the same manner as the two-level diffraction optic element 24 is derived from the construct 22, and may be fabricated in the same manner as the multiple-level diffractive optic element 24, shown in FIG. 2C. Likewise, it has the same disadvantages as the two-level diffractive optic element 24 in FIG. 2C. In particular, where used to deflect a beam of light, the light will not just be deflected in one direction 39, but some will travel straight through the element in the direction of arrow 37, and some will be deflected in a number of other directions symmetrical about arrow 37 and corresponding to higher diffraction orders, as shown by arrows 41. As a result, less than one half of the incoming beam power is directed in the desired direction and a number of additional beams of significant optical power are produced directly forward and at other angles. However, a sixteen-level diffractive optic element 44, corresponding to the prism 16, as shown in FIG. 3D, is virtually as effective as the prism 16. That is, about 99% of the power of an incoming optical beam will be deflected in a single direction 43.

Figure 4A:
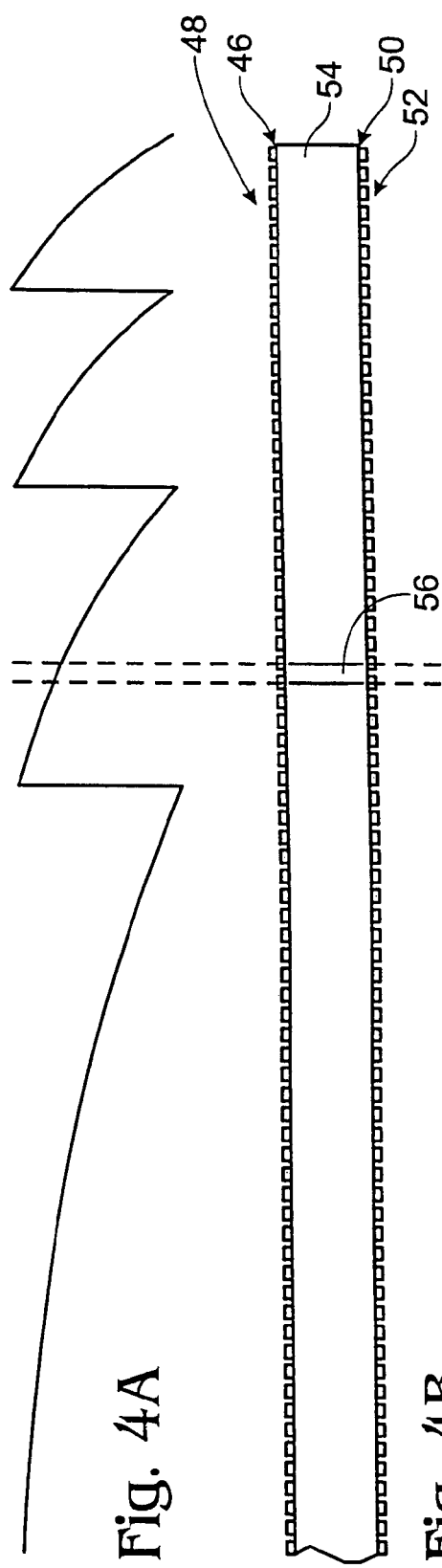
FIG. 4A is a diagram of the ideal index of refraction profile of a flat, transparent optical element derived from the variable-thickness construct shown in FIG. 2B.

While the foregoing examples of Fresnel lens-like constructs and multiple-level diffractive optic elements have been based upon variations in material thickness or transmissivity, the same result can be accomplished using a body of transparent material whose index of refraction varies in accordance with a desired profile. That is, a diffractive optic element may be constructed of material having two faces, each·face preferably, but not necessarily, being parallel to a plane defined by x and y axes and being perpendicular to a z axis, the z axis being the nominal, but not necessarily the actual, axis of transmission of incoming light. While the material preferably has substantially uniform thickness, its index of refraction with respect to a predetermined polarization and wavelength $\lambda_T$ varies in accordance with a predetermined profile. Thence, for example, where that index of refraction profile varies as shown in FIG. 4A, the device corresponds to a Fresnel lens-like construct of one-half of a plano-convex lens (the half not shown being a mirror-image of the half that is shown) and essentially has optical characteristics similar to those of a plano-convex lens for the pre-determined polarization and wavelength $\lambda_T$.

In general, such a device can be constructed to transform an optical wavefront in accordance with the following equation:

$$P(x)=P_0(x)+F(x)(\text{mod } P_{max})$$

where $P(x)$=the value of a selected transmission property with respect to dimension x, $P_0(x)$=a background value of the selected transmission property with respect to dimension x, $F(x)$=an arbitrary transmission property profile with respect to dimension x, $P_{max}$=a maximum permissible value of the transmission property, greater than zero and less than the maximum value of F(x), over a given range of x.

$P_0(x)$ represents a baseline or background value, which is analogous to the base thickness of a refractive optic. Thence, there would ordinarily be some point along some range of x where $P(x)-P_0(x)=0$. $P_0(x)$ would ordinarily be a constant and may be zero. However, $P_0(x)$ could also represent the variable transmission profile of another optic, such as the surface of a spherical refractive optic, or a combination of such a profile and a background value.

That $P_{max}$ is greater than zero and less than the maximum value of F(x) establishes the profile of a Fresnel lens-like construct. In addition, in accordance with the principles of the invention, $F(x)(\text{mod } P_{max})$ may be aperiodic, have various duty factors (where $F(x)(\text{mod } P_{max})$ is periodic) or have more than one non-zero value over the given range of x. "Spatial duty factor" refers to the ratio of the distance over which $F(x)(\text{mod } P_{max})$ exceeds a selected threshold value to the total period of $F(x)(\text{mod } P_{max})$ where $F(x)(\text{mod } P_{max})$ is periodic. "Value" is intended to include real and complex numbers. The qualities of aperiodicity and a spatial duty factor other than fifty percent permit the generation of arbitrary diffraction patterns. More than one non-zero value over the given range of x produces increased diffraction efficiency. These qualities also distinguish the device of the present invention from a mere diffraction grating.

In practice, F(x) may represent, or $F(x)(\text{mod } P_{max})$ may be represented by, an integral number of quanta $P_{max}/N$ of the transmission property, where N is an integer. Alternatively, F(x) may represent an approximation of an ideal transmission property profile I(x), or $F(x)(\text{mod } P_{max})$ may be represented by an approximation thereof. In either case, F(x) or $F(x)(\text{mod } P_{max})$ may be considered to include some quantization or approximation error Q(x) with respect to an ideal profile.

While the transmission property preferably used for implementation of the invention is phase delay, it is to be understood that any transmission property which produces analogous results may fall within the scope of the invention, and that the principles of the invention are not limited to phase delay transforms. Where the transmission property is phase delay, specifically denoted by "D", F(x) is the phase delay profile at the exit surface of the transform and $P_{max}$ preferably is $2\pi$ radians.

In addition it is to be recognized that a two dimensional device can be constructed where, in dimension y orthogonal to dimension x, the transmission property varies in accordance with the analogous equation:

$$P(y)=P_1(y)+G(y)(\mod P_{max})$$

Figure 4B:
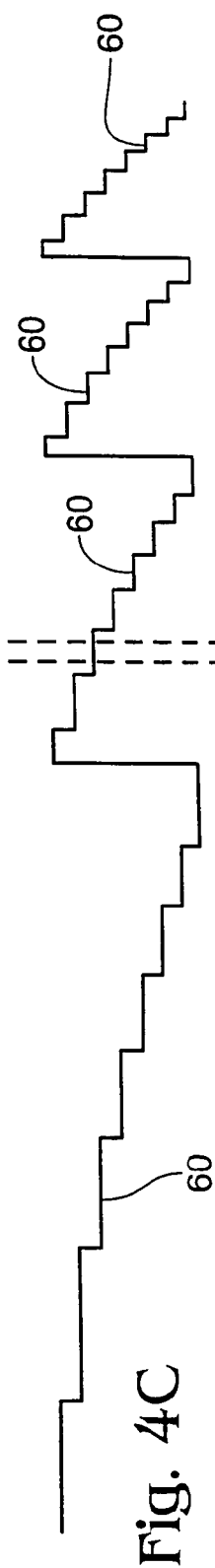
FIG. 4B is a side view of a transparent diffractive optical element having substantially-parallel faces wherein the material within the element is effectively partitioned along an axis x into a plurality of index of refraction divisions of equal width, the index of refraction of each division being selectively controllable according to the present invention.

In accordance with the present invention, such a device is made by disposing between two sets of electrodes, preferably in respective parallel planes, a body of material characterized in that it has an optical transmission property which varies in response to an electric potential applied across a portion of that material by the electrodes. This is shown in FIG. 4B, the first surface 46 having a linear array of electrodes 48 and the second surface 50 having either a linear array of electrodes 52, aligned with electrodes 48, or a single electrode covering the entire surface, the electrodes in any case being made of conductive transparent material. The body of material 54 so characterized is disposed therebetween. For the specific applications described herein, the transmission property preferably is phase delay D, as governed by the index of refraction with respect to a given polarization and given wavelength $\lambda_T$ of light. However, other transmission properties, such as transmissivity $\tau$ and, in some applications, retardance $\Gamma$, may be used without departing from the principles of the invention.

It has been found that the most suitable type of material to be used for the body of material 54 is liquid crystal material. This is because of its relatively high change in index of refraction in response to the application of a relatively low voltage. It has been found that nematic liquid crystal material is particularly suitable, though other liquid crystal materials may be used without departing from the principles of the invention. Further, while the simplest construction for the applications discussed herein has been found to be a linear array, or continuous sheet of transparent electrode material, it is to be recognized that patterns of electrodes addressable in more than one dimension may also be used without departing from the principles of the invention. Also, while the invention is described herein primarily in terms of one dimensional index of refraction, and concomitant phase delay, profiles and one dimensional electrode arrays, it is to be recognized that index of refraction profiles in more than one dimension fall within the scope of this invention.

The electrodes 48 and 52 of FIG. 4B effectively partition the body of material 54 into index of refraction divisions 56 of equal spacing, the index of refraction in each such division ideally being independently, selectively controlled by the voltage supplied to the electrodes corresponding to that division. Depending upon the transform to be produced, the size of the device and the availability of electronic circuit components to meet the need, the electrodes may be either individually addressable or addressable in predetermined groups, as explained hereafter.

The electrodes may be of equal or various widths and spacings. If arranged in two dimensions, they may have various sizes and separations. It is recognized that, depending on the sizes and separations of the electrodes and on the change of electric field potential from electrode to electrode, the transmission property may vary essentially continuously from division to division. However, for many applications, it is preferred that the feature sizes of the electrode pattern be on the order of the wavelength of light to be transformed so that, taken alone, each division of said body of material may cause significant diffraction of said light as it leaves the transform device. Significant diffraction occurs where the intensity of the light emanating from the transform at a pertinent point in space some distance from the transform cannot be predicted merely by the use of ray, or geometrical, optics techniques. By way of example, for a wavelength of 1.5 microns, electrode sizes and spacings on the order of 1.0 micron can be produced by etching using masks generated by electron beam lithography. Where this condition is satisfied, a transform may fall within the scope of the invention without using the Fresnel lens-like construct. This could be the case, for example, where the electric field pattern represents the transmissivity $\tau$ of a transmission type hologram.

In one embodiment, the voltage across each electrode pair corresponding to a division of the body of material 54, or the voltage applied to each electrode on one side corresponding to a division with respect to a planar electrode on the other side, would be selected so as to produce an index of refraction in that division as nearly equal to the average index of refraction over the same spacing as the ideal index of refraction profile shown in FIG. 4A. That is, the index of refraction of each division would be selected so that the set of divisions as a whole approximate the ideal profile shown in FIG. 4A. This approach is shown in FIG. 4D, each step 58 of the profile in FIG. 4D representing a separate division of the body material 54. Where there are relatively few divisions, so that the electronic drive circuitry need not be unduly complex, this approach may be the most desirable.

Figure 4C:
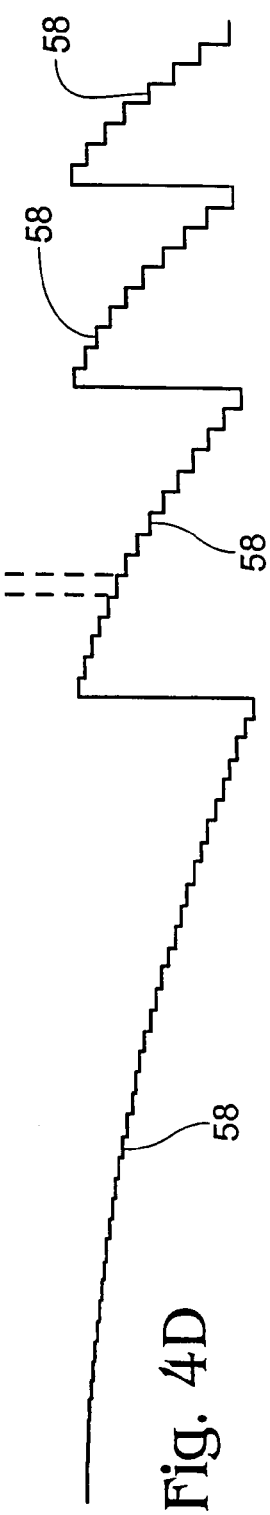
FIG. 4C is a diagram of the index of refraction profile of the material within the diffractive optical element of FIG. 4B, wherein the index of refraction in each division is selected so as to cause the element to function as a quantized, multiple-level optic element.
Figure 4D:
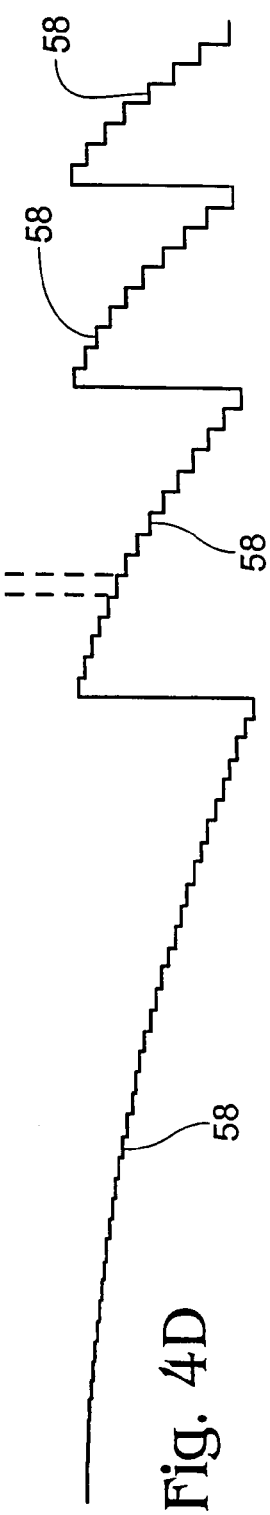
FIG. 4D is a diagram of the index of refraction profile of the material within the diffractive optical element of FIG. 4B, wherein the index of refraction in each division is selected so as to approximate the index of refraction profile shown in FIG. 4A.

However, in another embodiment of the present invention, the electrodes representing respective divisions are addressed so as to produce the index of refraction profile of a multiple-level diffractive optic element, as shown in FIG. 4C. Also, while only eight index of refraction levels are shown in FIG. 4C, preferably sixteen levels would be used in most applications. Thence, the steps 60 in FIG. 4C do not necessarily correspond to a single index of refraction division of the body of material 54, but in most cases correspond to several such divisions side-by-side. By way of comparison, in FIG. 4D, each step 58 is of equal width, while the "rise" from step to step varies continuously, limited primarily by the voltage resolution of the drive circuitry. In FIG. 4A, the rise between each step 54 is equal to the change in index of refraction required to produce, in the case of phase delay for example, quanta of phase delay equal to $2\pi$ radians divided by the number of quantization levels, while the width of each step varies based upon the quantization of the ideal index of refraction profile. As will be explained hereafter, a multiple-level, quantized diffractive optic approach is preferred for some applications described herein because of drive circuitry considerations.

Figure 5A:
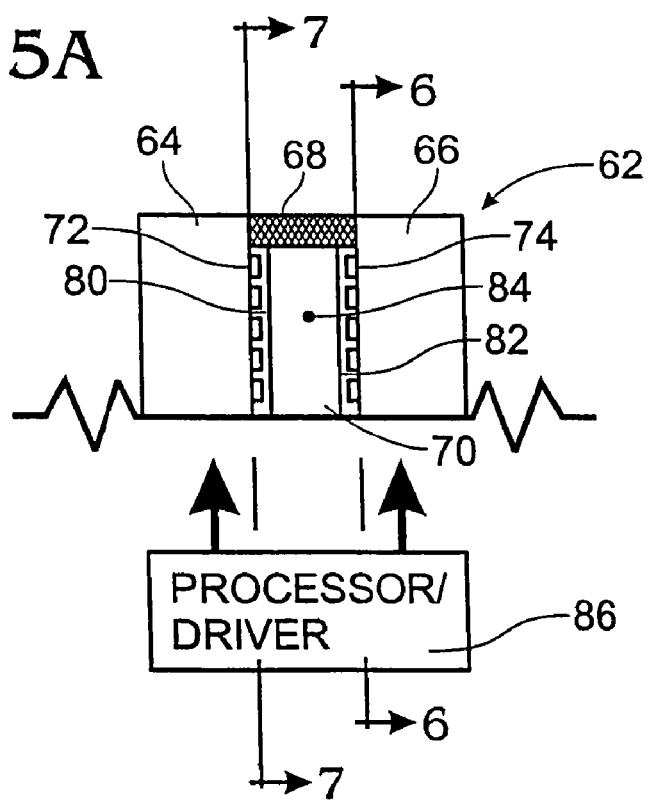
FIG. 5A is a simplified diagram of a preferred type of liquid crystal cell and electronic drive circuit according to the present invention for producing a diffractive optical element of the type shown in FIG. 4B, the liquid crystal cell being shown in broken away, cross section.

Turning to FIG. 5A, as a practical matter the dynamic diffractive optical transform of the present invention is preferably implemented as a liquid crystal cell 62. As is well understood in the art, such a cell is constructed of a pair of substantially parallel transparent plates 64 and 66, respectively, separated by spacers 68 and having liquid crystal material 70 disposed therebetween. For purposes of the applications described herein, the plates 64 and 66 are preferably made of optically flat glass, though in some instances quartz elements may be used, and would typically be about 1 mm thick. The spacers 68 are typically made of glass beads immersed in an epoxy to hold them in place, though spacers of other material may also be used. The spacing between the plates 64 and 66 is preferably in the range of about 8 to 25 microns.

Transparent electrode arrays 72 and 74 are disposed on the inside surfaces of the plates 64 and 66, respectively. Those surfaces also include alignment layers, 80 and 82, respectively. The electrode arrays 72 and 74 correspond to the sets of electrodes 48 and 52 of the device shown in FIG. 4B. The electrodes are typically made of indium tin oxide ("ITO") deposited onto the surface of the glass, and preferably are about 100–200 Angstroms thick at most to minimize attenuation, as is understood in the art. Polyimide or silicon monoxide may be used as the alignment layer, as is understood in the art. Preferably, nematic liquid crystal material with a high Δn (change in index refraction with a change in voltage) such as E44 is used. This material can exhibit a Δn as high as about 0.2. Molecules of such material are elongate and are preferably aligned in their elongate dimension with the elongate direction of the electrodes 80 and 82, as represented by the dot 84 in FIG. 5 indicating horizontal alignment. Construction of liquid crystal cells in general is understood in the art, as shown by Bricot et al. U.S. Pat. No. 4,037,929, Berreman U.S. Pat. No. 4,190,330, and Kowel et al. U.S. Pat. No. 4,572,616, which are hereby incorporated by reference in there entirety.

Figure 5B:
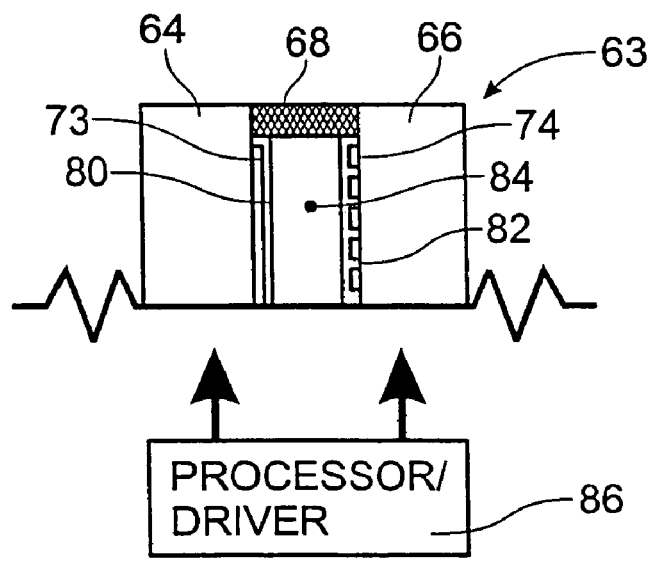
FIG. 5B is a simplified diagram of an alternative type of liquid crystal cell and electronic device circuit according to the present invention for producing a diffractive optic element of the type shown in FIG. 4B, the liquid crystal cell being shown in broken away, cross section.

The liquid crystal cell 63 of FIG. 5B is identical to cell 62 of FIG. 5A, except that electrode array 72 has been replaced by a single sheet electrode 73. While this makes assembly easier by avoiding the need for alignment of electrode pairs, it makes the electric field patterns between adjacent electrodes less distinct and may therefore be less desirable in some applications.

Such liquid crystal cells are polarization sensitive. That is, the polarization component of light corresponding to one eigenaxis of the liquid crystal material will pass through the liquid crystal material unaffected by a change in voltage across the material, whereas a polarization component of the light corresponding to the other eigenaxis can be retarded relative to the first axis by varying the voltage across the liquid crystal material. In the case of FIGS. 5A and 5B, the liquid crystal cell only effects horizontally polarized light. However, as will be explained hereafter, techniques may be employed to make devices according to the present invention polarization insensitive, where necessary. The processor/driver 86 of FIG. 5A and 5B comprises a digital processor and drive circuitry for placing a selected voltage computed by the processor on each electrode of the liquid crystal cell, based upon the index of refraction profile desired and the retardance r produced by the liquid crystal material (which equates generally with index of refraction along the dimension of one eigenaxis), to produce the construct approximation or binary optic transform element as previously explained. Two alternative embodiments of the processor/driver 86 are described below.

Figure 6:
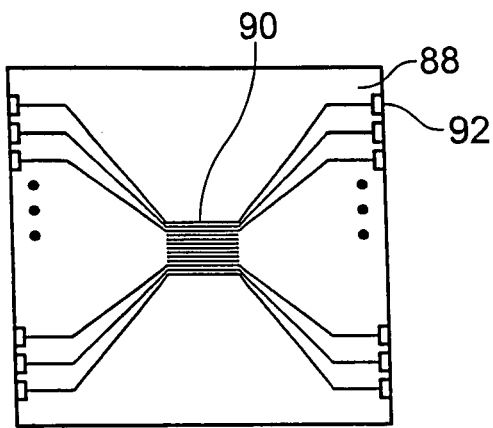
FIG. 6 is a view of a transparent substrate of the liquid crystal cell of FIG. 5 taken along line 6—6 thereof and showing a transparent electrode configuration disposed on the substrate.

The electrode configuration for a relatively simple liquid crystal dynamic diffraction optical transform cell is shown in FIG. 6. The transparent substrate 88, corresponding to either of plates 64 or 66 has an array of electrodes 90 which fan out to connection pads 92 at the edge of the substrate.

Figure 7:
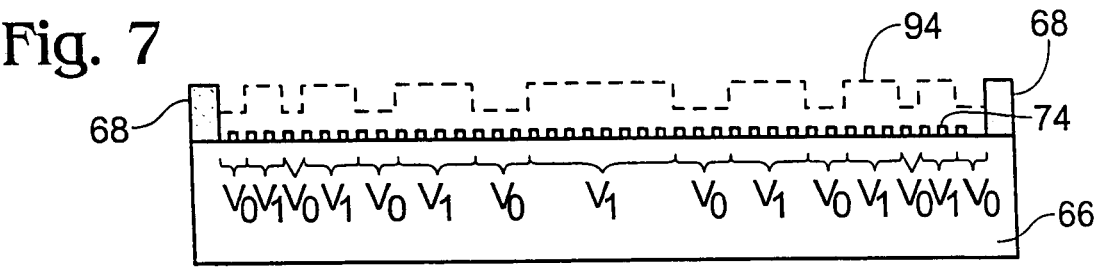
FIG. 7 is a side view of the liquid crystal cell of FIG. 5A taken along line 7—7 thereof so as to show only one transparent substrate, and showing the distribution of voltages applied to the electrodes of that substrate, and a binary optic index of refraction profile produced by those voltages according to the present invention.

FIG. 7 shows a side view of one half of a liquid crystal cell, along with the voltages applied to sets of electrodes so as to produce a simple two-level diffractive optic element. Line 94 represents the index of refraction profile produced by the voltages $V_0$ and $V_1$, corresponding to level "0" and level "1", applied to selected sets of the electrodes 74. This device produces what is commonly known as a "zone plate".

Figure 8:
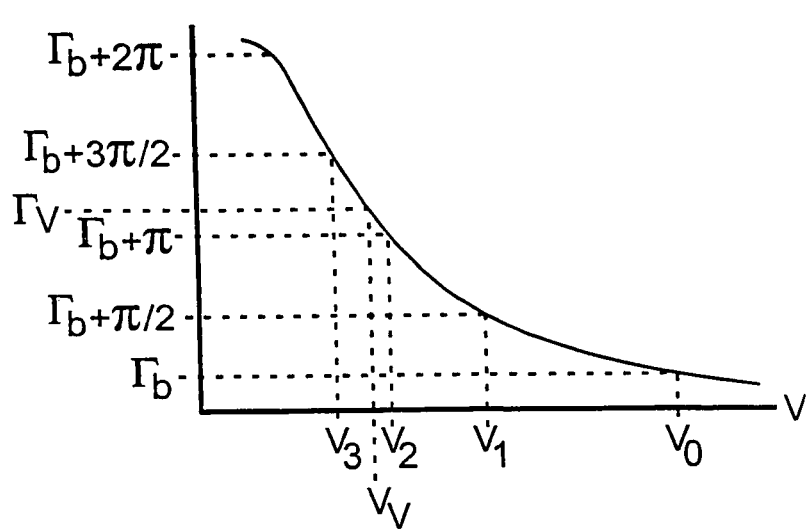
FIG. 8 is a graph of retardance as a function of voltage applied across a liquid crystal material for a given wavelength of light.
Figure 9A:
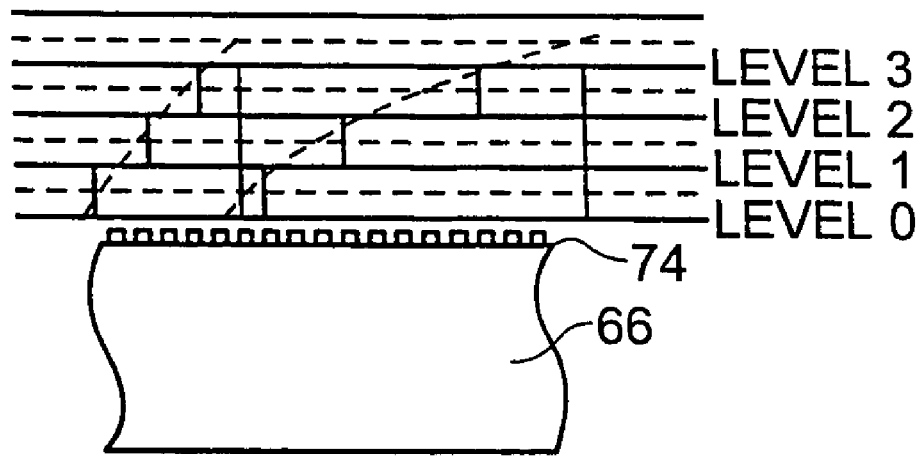
FIG. 9A shows a partial, side view of the liquid crystal cell of FIG. 5A, showing only one transparent substrate and a four-level optic index of refraction profile produced by the distribution of voltages applied to the electrodes of that substrate corresponding to the profile of FIG. 4A according to the present invention.

The retardance $\Gamma$ produced by nematic liquid crystal material is a non-linear function of the voltage applied across the material, as shown in FIG. 8. Therefore, the drive circuit must take that retardance-voltage characteristic (which is equivalent to an index of refraction-voltage characteristic for a given polarization) into account in computing and applying the proper voltage to the electrodes to achieve the desired index of refraction profile. Thence, as shown in FIG. 8, to produce a four-level diffractive optic device, each non-zero level corresponding to $\pi/2$ additional radians of retardance, or phase delay for a selected polarization, voltages V0, V1, V2 and V3 must be used, those voltages having a non-linear relationship and not being equally spaced. This is illustrated in FIG. 9A, which shows a portion of a liquid crystal cell used to produce a binary optic element corresponding to the construct or FIG. 2B. The voltage is applied to respective electrodes 74 based on the characteristic curve of FIG. 8.

Figure 9B:
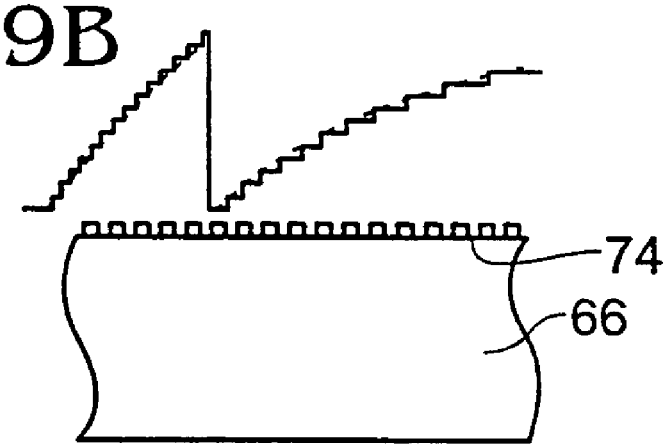
FIG. 9B shows a partial, side view of the liquid crystal cell of FIG. 5A, showing only one transparent substrate and the index of refraction profile produced by a distribution of voltages applied to the electrodes of that substrate to approximate the index of refraction profile of a portion of FIG. 4A according to the present invention.

In FIG. 9B, each electrode is individually addressed, so as to apply the voltage needed to approximate the ideal index of refraction profile. The voltage for each division of the liquid crystal material to obtain the ideal retardance, or phase delay for a predetermined polarization, is also determined from the characteristic curve of FIG. 8.

Figure 10A:
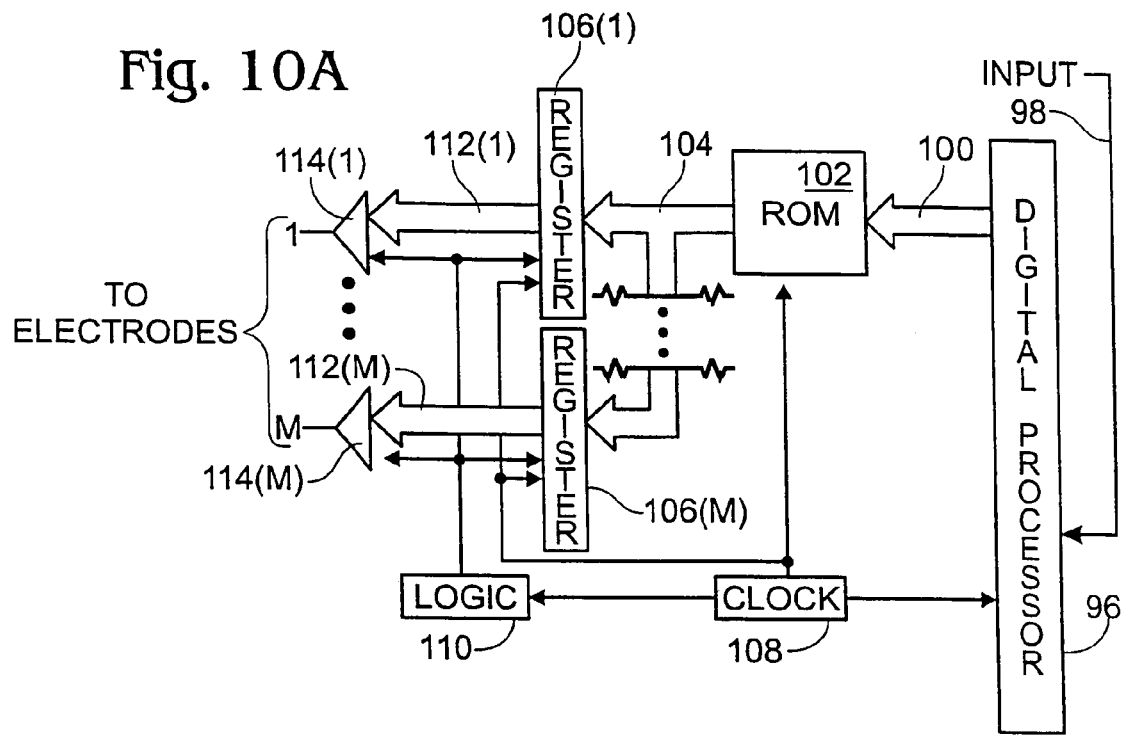
FIG. 10A shows a block diagram of one embodiment of the drive circuit of FIGS. 5A and 5B wherein voltages are applied to the liquid crystal cell electrodes so that the index of refraction of each division of the liquid crystal is individually selected according to the present invention.

One embodiment of the processor/driver circuit 86 for driving each electrode pair separately so as to approximate the ideal index of refraction profile is shown in FIG. 10A. It comprises electronic digital processor, preferably a microprocessor, 96 programmed to compute and apply the voltages for a desired index of refraction profile. It includes a program memory, as is commonly understood in the art, and may be either dedicated to a specific purpose or have an input 98 for selecting a particular diffractive optic function. It produces a parallel digital output bus 100 which drives a read-only memory ("ROM") 102. The characteristic curve for the liquid crystal material, as shown in FIG. 8, is stored, in digital form, in the ROM 102.

In response to the index of refraction selection input from bus 100, the ROM 102 produces a voltage selection digital output on bus 104, which is applied as an input to each of M registers 106(1) to 106(M). M is the number of electrodes to be separately addressed for application of a selected voltage. In operation, a first index of refraction selection word is applied by the processor 96 to the ROM 102, which produces a first voltage selection on bus 104. Clock 108, which drives the processor 96, ROM 102, registers. 106(1)–106(M), together with a logic circuit 110, cause that first word to be latched into register 106(1). Similarly, the next M voltage selection words are selected and latched into respective registers. Thereafter, the logic circuit 110 applies the words in registers 106(1) through 106(M), over respective busses 112(1) through 112(M) to respective digital-to-analog converters 114(1) through 114(M). The digital-to-analog converters produce respective outputs which are applied to electrodes 1 through M of the liquid crystal cell, thereby producing the desired index of refraction profile. Where there are a large number M of electrodes, a digital drive circuit such as this may become impractical, though other types of drive circuits may be used without departing from the principles of the invention.

Figure 10B:
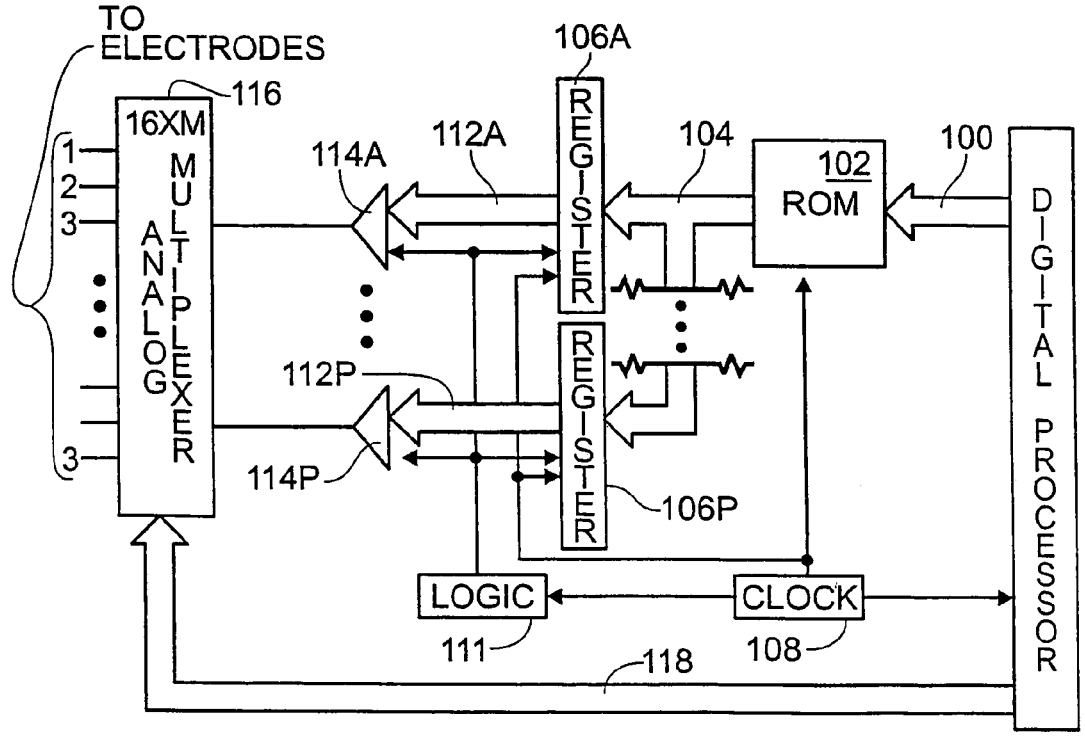
FIG. 10B shows a block diagram of another embodiment of the drive circuit of FIGS. 5A and 5B wherein voltages are applied to the liquid crystal cell electrodes so that the index of refraction of each division of the liquid crystal is selected from a predetermined set of values according to the present invention.

Turning now to FIG. 10B, an alternative processor/drive circuit 86 particularly adapted for a multiple-level quantized diffractive optic transform is similar to that shown in FIG. 10A. However, there are certain differences which are explained hereafter. First, assuming that, as is preferred, a 16-level device is to be produced, there need only be 16 registers, 106A–106P, 16 busses 112A–112P and 16 digitalto-analog converters, 114A–114P, corresponding to the 16 binary-optic levels. Second, the circuit requires a 16 by M analog multiplexer 116, M being equal to the number of independently addressable electrodes. Third, the multiplexer 116 is controlled by a digital logic bus 118 from the processor 96. Fourth, logic circuit 111 will be slightly different from logic circuit 110, as can readily be understood by a person skilled in the art.

In this case, the digital words on bus 100 may simply range from 0 to 15 and they produce, as outputs from the read-only memory 102, voltages corresponding to positive integer multiples of, or zero times, $2\pi/16$ radians of phase delay, based upon the characteristic curve of the liquid crystal material, as illustrated in FIG. 8. Those voltages appear, respectively, at the outputs of the digital-to-analog converters 114A–114P. The signal on bus 118 causes the analog multiplexer 116 to select one of those 16 voltages for application to each of the electrodes that is to be independently addressable in order to produce the desired index of refraction profile. It is to be recognized, however, that the processor may actually compute variations from the ideal index of refraction profile in order to compensate for imperfections in the optical surfaces of the transform or to achieve other goals, and apply a corresponding digital number on bus 100.

As is understood in the art, liquid crystal cells are actually driven by an AC signal, typically a square wave of about 100 Hz to a few kilohertz. In this case, logic circuits 110 and 111, together with clock 108, are designed to cause the digital-to-analog converter sets 114(1)–114(M) and 114A–114P to produce square wave outputs whose peak amplitudes are equal to the desired drive voltages, as is readily understood by a person skilled in the art.

Figure 10C:
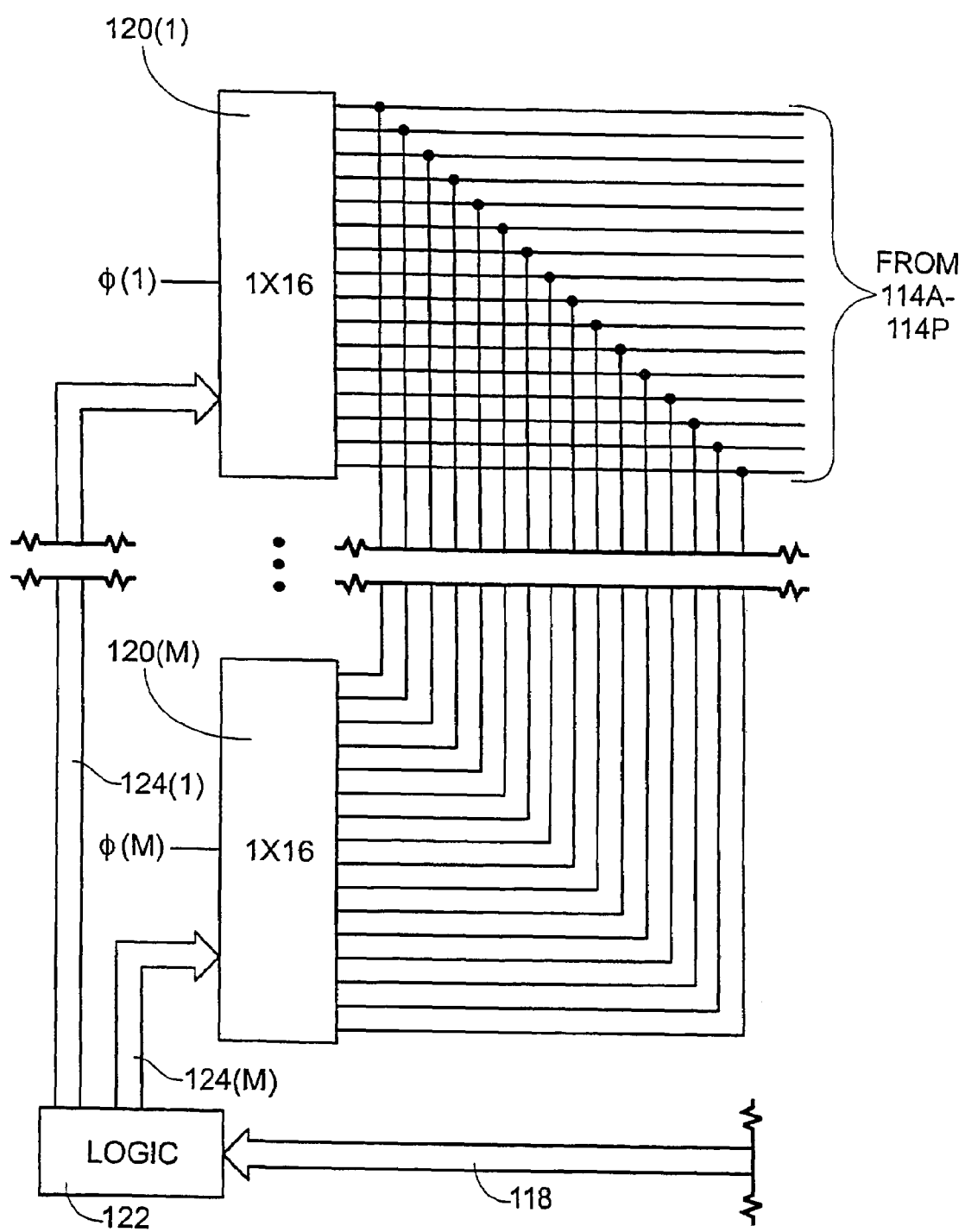
FIG. 10C shows one way of constructing the analog multiplexer of FIG. 10B.

FIG. 10C shows one way of constructing the 16-by-M analog multiplexer using off-the-shelf one-by-16 analog multiplexer integrated circuits, 120(1) through 120(M). Their 16 inputs are connected in parallel and their individual outputs $\phi(1)$ through $\phi(M)$ represent the outputs to the M transform electrodes. Such devices are available from, for example, NTE of New Jersey under the part number designation 4067"Single 16 Channel Analog Multiplexer/Demultiplexer". A logic circuit 122 receives the signal from bus 118 and provides eight bit logic signals on buses 124(1) through 124(M) to the respective one-by-16 multiplexers 120(1) through 120(M) so as to cause them to select the appropriate multiple-level optic voltage level. The logic circuit may be constructed of commonly available conventional logic components, such as a programmed logic array.

One particularly useful application for a dynamic diffractive optical transform according to the present invention is as a scanner, or light beam steering device. This is illustrated in simplified form in FIGS. 11A–11E. Those figures show a sequence of index of refraction profiles for a four-level diffractive optic representation of a prism whereby a light beam 144 may be steered through an arc. The parallel lens 145 represent the surfaces of the transform, e.g., a liquid crystal cell, and the dashed lines 147A through 147E represent the phase delay profile produced by the material in the transform. Preferably, however, a 16-level device would be used, as shown in FIG. 12, so as to avoid significant higher order diffraction components.

Because of the symmetry of a Fresnel lens-like construct derived from a prism, only 16 lines of the electrode pairs need be separately addressed for a sixteen-level diffractive optic representation of that construct. This means that minimal components may be used to construct a drive circuit as shown in FIGS 10A or 10B, and a relatively high resolution transform for steering narrow beams of light can be fabricated. For example, a device may be fabricated so as to steer a beam of coherent light about 2 mm in diameter over an angle in excess of 5° in less than one millisecond. This can be accomplished by a liquid crystal cell whose electrodes are configured as shown in FIG. 13A–13B.

FIG. 13A shows a pattern of ITO with a plurality of parallel electrodes 146 disposed on a glass substrate 148. The electrodes are grouped into sets 150 of 16 electrodes, each having two subsets 152 and 154 of 8 electrodes. Each set of 16 electrodes corresponds to one multiple-level diffractive optic construct component. For a 2 mm diameter beam, the electrodes preferably are at least 2 mm long and repeat in sets 150 for a distance of at least 2 mm. For convenience, essentially only one set 150 of such electrodes is shown in a cut-away portion 156 of FIG. 13A; however, it is to be understood that the glass substrate 148 is much larger than shown by portion 156 and that there are many sets 150 on the substrate. Every other set 150 has its corresponding electrodes connected together. In addition, subsets 152 connect at one side to respective input lines 158, and subsets 154 connect at the other side to respective input lines 160, for a total of only 16 input lines for the device. Those input lines fan out to 16 respective input pads 162 on the substrate, as shown by portion 164 of FIG. 13B. The input lines 158 and 160, and input pads 162 may be made of ITO or some other suitable material. The pads may be connected to the processor device circuit 86 by any suitable means, such as graphite impregnated rubber connections. In this case, the processor/driver circuit is preferably of the type shown in FIG. 10A.

FIG. 13C shows how individual electrodes 146 cross over other electrodes, so as to be interconnected, the electrodes 146 having an interconnection section 116 and being separated by a suitable insulator 166 such as silicon oxide or polyimide. In the embodiment shown, the electrodes 146 may be, for example, about 1 micron wide and spaced at about 1 micron apart, though smaller or wider electrode widths and smaller or wider spacings may be desirable and achievable, depending on the applications and desired results. The input lines 158 and 160 may be any convenient width and spacing. Such a substrate may be constructed by producing masks with electron beam lithography, which can resolve features as small as 1 micron wide with spacing as small as 0.1 micron, and using the masks to deposit ITO, silicon oxide and other material, such as gold, for interconnection, in a conventional photo lithography etching process of the type employed to manufacture integrated circuits.

Figure 14:
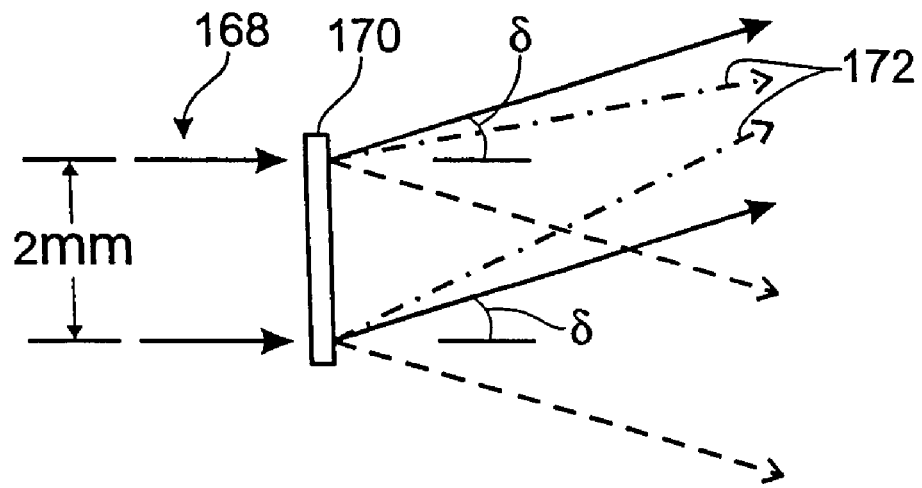
FIG. 14 illustrates how a dynamic diffractive optical element according to the present invention is used to steer and focus a light beam.

The overall effect of the device shown by FIGS. 13A, B and C in steering a light beam 168 2 mm wide is shown in FIG. 14. Element 170 is a dynamic diffraction optic transform using a liquid crystal cell having an electrode configuration as shown in FIGS. 13A, B and C and preferably a processor/driver circuit as shown in FIG. 10A. The amount of beam deflection δ that can be obtained is:

$$\delta = \sin^{-1}[T(n_1-n_0)/W]$$

where

δ=the deflection angle,

T=the thickness of the liquid crystal cell,

W=the minimum width of the construct component, $n_0$=the minimum index of refraction, and $n_1$=the maximum index of refraction, corresponding to a phase delay of $2\pi$ radians from the minimum index of refraction.

For electrode widths of 1 micron and spacings of 1 micron (the smallest construct component being 16×2 microns, or 32 microns wide), a cell thickness of 15 microns, a minimum index of refraction of 1.5 and a maximum index of refraction of 1.7, $\delta=5.4°$ of deflection may be obtained.

In addition to steering the beam, the transform 170 may be used to focus the beam, as shown by lines 172. This is accomplished by modifying the input data on bus 100 in FIG. 10A so as to produce an index of refraction profile that is somewhat convex, like a plano-convex lens, as well as tilted, like a prism. That is, if L(x) represents the hypotenuse of a right rectangular prism with respect to its base, Q(x) represents a convex function, so that F(x)=L(x)+Q(x), F(x) being evaluated modulo $2\pi$.

Figure 15:
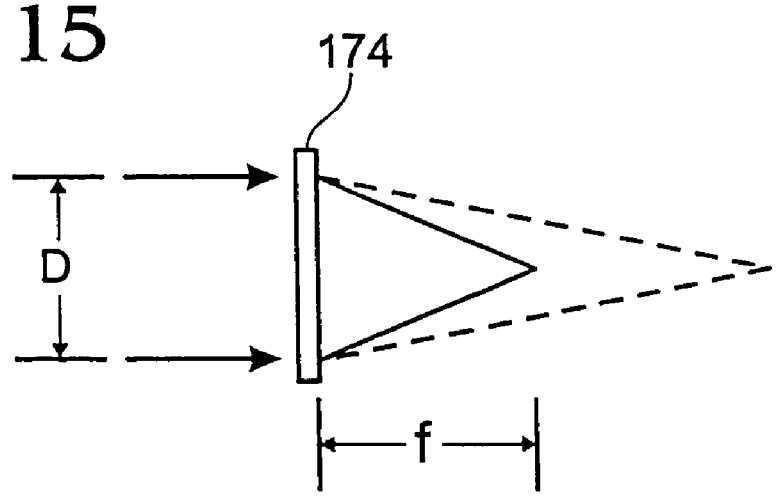
FIG. 15 illustrates how a dynamic diffractive optical element according to the present invention is used as a lens to focus a light beam.

Another application for a dynamic diffractive optical transform according to the present invention is as a variable focal length lens, for example a plano-convex lens. The ideal index of refraction profile of a transform derived from a Fresnel lens-like construct of a plano-convex lens is shown in FIG. 4A. The index of refraction profile for an eight-level quantized diffractive optic element corresponding to that Fresnel lens-like construct is shown in FIG. 4C. The index of refraction profile for a corresponding diffractive optic element where the ideal profile is approximated is shown in FIG. 4D. By applying a different combination of voltages to the electrodes 48 and 52 of FIG. 4B, so as to produce an index of refraction profile corresponding to a Fresnel lens-like construct derived from a plano-convex lens having a longer radius of curvature the focal length f of the diffractive optic transform can be increased, and vice-versa, as shown in FIG. 15. It is to be recognized, however, that the actual focal length of the dynamic diffractive optical transform must be computed based on principles of diffraction, rather than conventional refraction formulas.

Figure 16A:
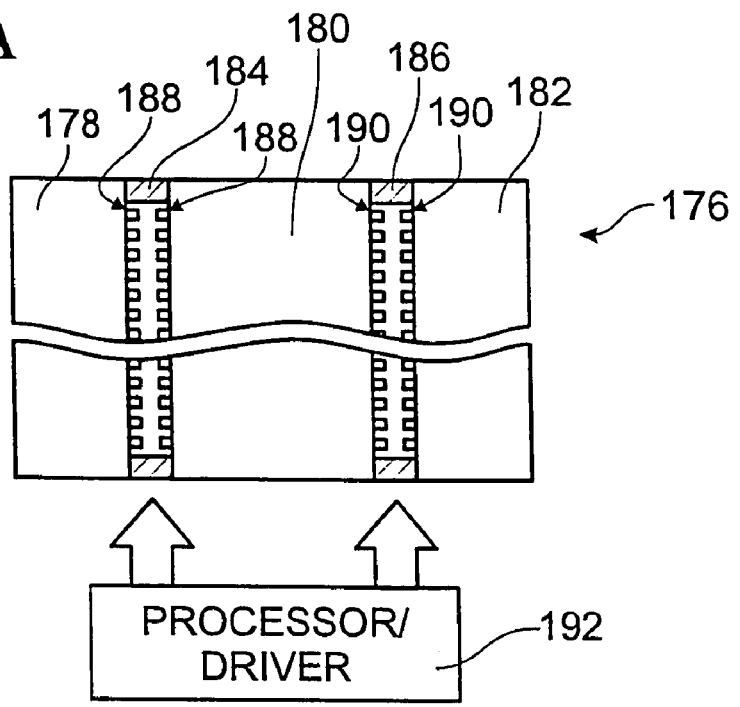
FIG. 16A shows a liquid crystal dynamic diffractive optical element according to the present invention which is substantially polarization insensitive.
Figure 16A:
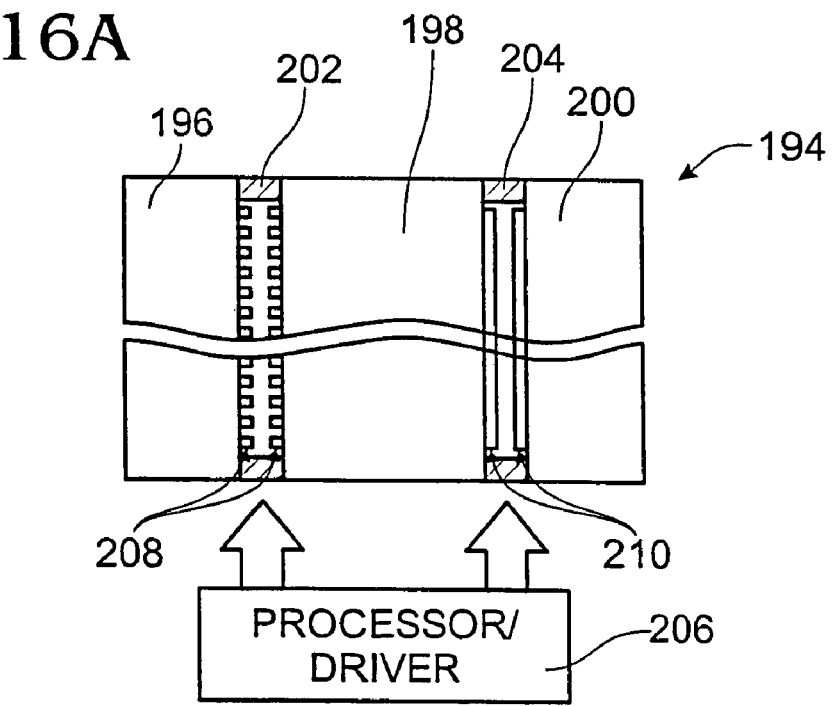

The previous descriptions have assumed that the transform is operating on coherent light of a selected, predetermined polarization. That is not always so. FIG. 16A shows a polarization insensitive transform 176. It comprises a first transparent substrate 178 a second transparent substrate 180 and a third transparent substrate 182. The first and second substrates are separated by spacers 184 and the second and third substrates are separated by spacers 186. A set of electrode pairs 188 are disposed on the first and second substrates and a set of electrode pairs 190 are disposed on the second and third substrates. The electrodes of pairs 188 and 190 are all parallel to one another. Liquid crystal material, aligned in the same direction, parallel to the electrode pairs, is disposed between the first and second substrates and between the second and third substrates. This results in two liquid crystal cell transforms in series, which are respectively driven by a processor/driver 192. To achieve polarization insensitivity, the substrate 180 actually comprises a half wave plate, that is a birefringent material such as quartz, which produces retardance at a given wavelength so as to rotate the polarization of the light from the left-hand liquid cell 90° before it enters the right-hand liquid crystal cell. The eigenaxes of each liquid crystal cell are aligned, but the eigenaxis of the half wave plate must be placed at 45° to the eigenaxis of the liquid crystal cells.

A two-dimensional dynamic diffractive optic transform 194 according to the present invention can be constructed as shown in FIG. 16B. It comprises a first transparent substrate 196, a second transparent substrate 198, a third transparent substrate 200, spacers 202 and 204 between the first and second substrates and the second and third substrates, respectively, and a processor/driver 206. Electrode pairs 208 are disposed on the first and second substrates and liquid crystal material is disposed and aligned between them as in FIG. 16A. Similar electrode pairs 210 are disposed on the second and third substrates, but they and the liquid crystal material between them are aligned perpendicular to the electrode pairs 208. Thence, the left-hand cell diffracts light in an up and down dimension, while the right-hand cell diffracts light in a dimension in and out of the drawing.

Figure 17A:
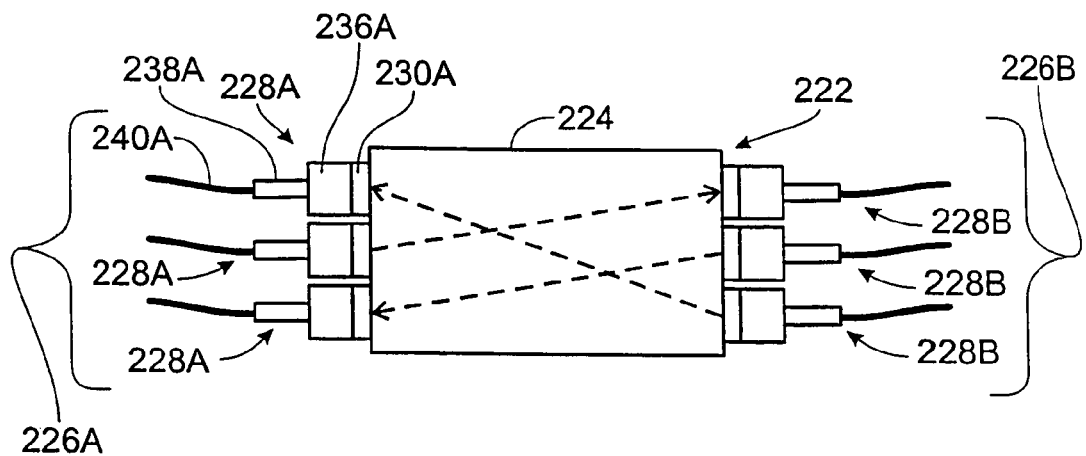
FIG. 17A shows a side view of a liquid crystal dynamic diffractive optical element incorporated in an optical switch according to the present invention.
Figure 17B:
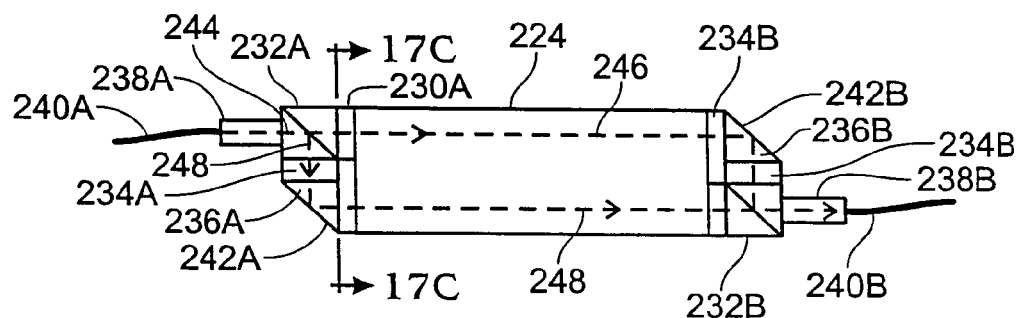
FIG. 17B shows a top view of the switch of FIG. 17A.
Figure 17C:
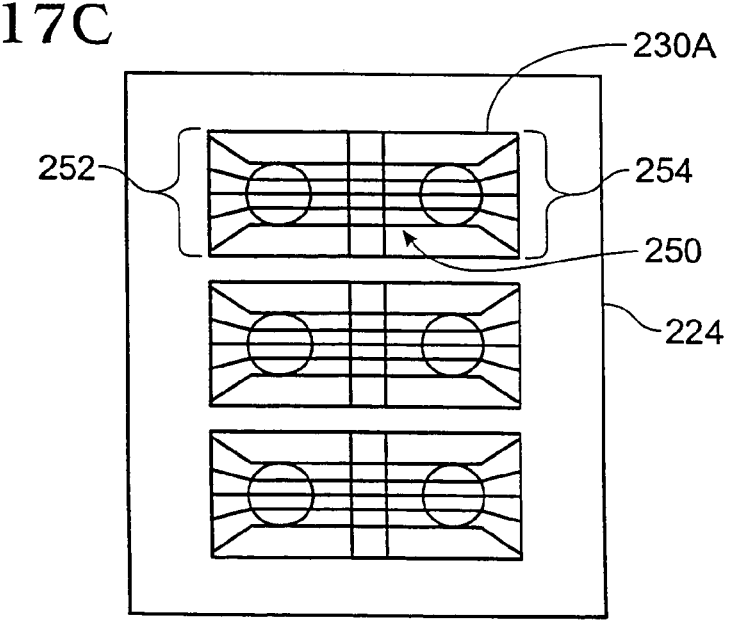
FIG. 17C shows an end view of the switch of FIG. 17A taken along line 17C—17C.

A specific application of a dynamic diffractive optic transform according to the present invention as an optical switch is shown in FIGS. 17A–17C. While various switch configurations can be constructed using such a transform without departing from the principles of the invention, the application is illustrated with respect to a 3×3 switch 222. That is, any of the ports of a first set of three ports can be connected to any of the ports of a second set of three ports simultaneously, but exclusively.

The switch 222 comprises a transparent main body 224, having a first set 226A of three ports at one end and a second set 226B of three ports at the other end. For purposes of explanation, port parts in the set 226A referred to herein carry the letter "A", while those of set 226B carry the letter "B" after their identifying number.

In a preferred embodiment, each port 228A and 228B comprises a dual dynamic diffractive optic transform 230, a polarizing beam splitter 232, a half wave plate 234, a reflecting prism 236, a graded index ("GRIN") lens 238 and an optical fiber 240 "pig-tailed" to the GRIN lens, as is understood by a person skilled in the art. It is to be recognized, however, that other types of lenses, or no lenses at all, may be used without departing from the principles of the invention. The transform 230 is referred to as "dual", because it serves to diffract two orthogonal polarization components of a light beam simultaneously, as is explained hereafter. Preferably, the main body 224 is made of a high index of refraction glass, matched as closely as possible with the index of refraction of the polarizing beam splitter 232 and the prism 236. The reflecting prism 236 has a high efficiency reflecting surface 242. The transform preferably is of the type described with respect to FIGS. 13A, B and C, except that the electrodes would be a little over twice as long, so as to serve two beams of light simultaneously.

Referring specifically to FIG. 17B, a light beam 244 emanating from a fiber 240A is substantially collimated by a GRIN lens 238A. It is then split into two orthogonal polarization components 246 and 248 by a polarizing beam splitter 232A. One component 246 travels directly through a first portion of a transform element 230A, which steers it up, straight ahead or down, to one of the ports 228B of set 226B. At the port 228B it is directed by a first portion of a like dual transform element 230B to a corresponding reflective prism 236B, which reflects it through a corresponding half wave plate 234B. The half wave plate rotates the polarization 90°. Component 246 then travels through a polarizing beam splitter 232B in that port, which directs it into a corresponding GRIN lens 238B, which couples it into a corresponding fiber 240B.

At the same time, component 248 is reflected 90° by polarizing beam splitter 232A, which directs it through a half wave plate 234A, thereby rotating its polarization 90°. The component 248 is then reflected 90° back to its original direction of propagation by prism 236A and through a second portion of a transform element 230A. The transform element 230A steers component 248 to exactly the same port in set 226B as it steered the component 246. A second portion of the transform element 230B directs the component 248 into beam splitter 232B, which recombines the component 248 with the component 246, both of which are coupled into the fiber 2401. Thus, the beam which entered the switch 222 by fiber 240A exits by fiber 240B unchanged, regardless of its state of polarization.

As can be seen in FIG. 17C, which shows the electrode configuration for the dual transform element 230, one set of electrodes 250 serves both portions of the transform and can be driven by one corresponding processor/driver circuit, though to reduce space, one-half of the 16 interconnection leads extend to one end 252 of the transform while the other half extend to the other end 254 of the transform. Each transform for each corresponding port employs a processor/driver circuit, all of which are coordinated by a central processor (not shown), as is understood by a person having skill in the art, to switch beams between fibers 240A and fibers 240B, selectively, as shown in FIG. 17A specifically. That is, any port 228A can be switched to any port 228B, and the light can travel in either direction, while any other port 228A is switched to any other port 228B. In addition, the processor/driver circuit for each port can be programmed to focus the beam components 246 and 248 slightly to compensate for the diffraction that occurs between ports.

It is to be understood that, while a 3×3, one dimensional switch has been described by way of example, other switch configurations may be employed without departing from the principles of the invention. In particular, an N×M switch can be constructed in the same basic configuration, where N and M are positive integers, within certain physical and performance limits. Moreover, a two dimensional, polarization-insensitive switch can be constructed using respective matrices of ports at each end of a transparent main body, where, instead of splitting the incoming beam into two orthoganal polarization components, the features shown in FIGS. 16A and 16B are employed in series to construct two-dimensional, polarization-insensitive transform elements.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A dynamic optical transform, comprising:
    a body of material that has an index of refraction whose value varies in response to an electric potential placed across a portion of the material;
    a first electrode disposed adjacent the body of material and a second electrode disposed adjacent the body of material, at least one of the first and second electrodes being addressable so as to apply a selected spatial pattern of electric potential to the body of material; and
    a processor for receiving arbitrary optical thickness profile information and, in response thereto, producing and applying to said at least one of the first and second electrodes a spatial pattern of electric potential so as to cause the body of material to produce a retardance profile corresponding essentially to a Fresnel lens-like construct of the arbitrary optical thickness profile.

2. The dynamic optical transform of claim 1, wherein the material comprises liquid crystal material.

3. The dynamic optical transform of claim 2, wherein the liquid crystal material is disposed within a liquid crystal cell.

4. The dynamic optical transform of claim 3, wherein at least one of said first and second electrodes is substantially transparent over a selected optical wavelength range.

5. The dynamic optical transform of claim 4, wherein at least one of said first and second electrodes comprises indium tin oxide.

6. The dynamic optical transform of claim 3, wherein said first electrode is disposed on one side of said liquid crystal cell and said second electrode is disposed on the opposing side of said liquid crystal cell.

7. The dynamic optical transform of claim 6, wherein said at least one of the first and second electrodes comprises an array of separately addressable electrode elements.

8. The dynamic optical transform of claim 3, wherein said at least one of the first and second electrodes comprises an array of separately addressable electrode elements.

9. The dynamic optical transform of claim 1, wherein said at least one of the first and second electrodes comprises an array of separately addressable electrode elements.

10. A dynamic optical transform, comprising:
    a body of material that has an index of refraction whose value varies in response to an electric potential placed across a portion of the material;
    a first electrode disposed adjacent the body of material and a second electrode disposed adjacent the body of material, at least one of the first and second electrodes being addressable so as to apply a selected spatial pattern of electric potential to the body of material; and
    a processor for receiving arbitrary optical thickness profile information and, in response thereto, producing and applying to said at least one of the first and second electrodes a spatial pattern of electric potential so as to cause the body of material to produce a quantized index of refraction profile corresponding essentially to the arbitrary optical thickness profile.

11. The dynamic optical transform of claim 10, wherein the material comprises liquid crystal material.

12. The dynamic optical transform of claim 11, wherein the liquid crystal material is disposed within a liquid crystal cell.

13. The dynamic optical transform of claim 12, wherein said first electrode is disposed on one side of said liquid crystal cell and said second electrode is disposed on the opposing side of said liquid crystal cell.

14. The dynamic optical transform of claim 13, wherein the processor is adapted to reduce the arbitrary optical thickness profile to a Fresnel lens-like construct thereof and the quantized retardance profile is based on the Fresnel lens-like construct.

15. The dynamic optical transform of claim 10, wherein at least one of said first and second electrodes is substantially transparent over a selected optical wavelength range.

16. The dynamic optical transform of claim 10, wherein said at least one of the first and second electrodes comprises an array of separately addressable electrode elements.

17. The dynamic optical transform of claim 10, wherein the processor is adapted to reduce the arbitrary optical thickness profile to a Fresnel lens-like construct thereof and the quantized retardance profile is based on the Fresnel lens-like construct.

18. A method for transforming the wavefront of a light beam, comprising:
    directing the light beam through a body of material that has an index of refraction whose value varies in response to an electrical potential placed across a portion of the material;
    determining from arbitrary optical thickness profile information a spatial pattern of electric potential that, when applied to at least one face of the body of material, will cause the body of material to produce a retardance profile corresponding essentially to the arbitrary optical thickness profile; and applying to said at least one face of the body of material the spatial pattern of electric potential so determined.

19. The method of claim 17, wherein said determining includes reducing the arbitrary thickness profile to a Fresnel-like construct thereof whereby the retardance profile is based on the Fresnel-like construct.

20. The method of claim 18, wherein said determining of said electric potential comprises determining quantized electric potential values and said applying comprises applying the quantized electric potential values so determined.

* * * * *